US011887258B2

(12) United States Patent
Green

(10) Patent No.: US 11,887,258 B2
(45) Date of Patent: *Jan. 30, 2024

(54) DYNAMIC INTEGRATION OF A VIRTUAL ENVIRONMENT WITH A PHYSICAL ENVIRONMENT

(71) Applicant: Virtex Apps, LLC, Redwood City, CA (US)

(72) Inventor: Jeffrey Michael Green, Redwood City, CA (US)

(73) Assignee: Virtex Apps, LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,075

(22) Filed: Feb. 16, 2021

(65) Prior Publication Data
US 2021/0166491 A1 Jun. 3, 2021

Related U.S. Application Data

(63) Continuation of application No. 14/872,168, filed on Oct. 1, 2015, now Pat. No. 10,943,395.
(Continued)

(51) Int. Cl.
*G06T 19/00* (2011.01)
*G06F 3/0346* (2013.01)
(Continued)

(52) U.S. Cl.
CPC ............ *G06T 19/006* (2013.01); *G06F 3/011* (2013.01); *G06F 3/0346* (2013.01);
(Continued)

(58) Field of Classification Search
CPC ... G06T 19/006; G06T 2200/24; G06F 3/013; G06F 3/0482; G06F 3/167; G06F 3/011;
(Continued)

(56) References Cited

U.S. PATENT DOCUMENTS 6,975,959 B2   12/2005   Dietrich et al.
8,368,721 B2    2/2013   McCoy
(Continued)

*Primary Examiner* — Jin Cheng Wang
(74) *Attorney, Agent, or Firm* — Carr & Ferrell LLP

(57) ABSTRACT

A computer implemented method and a virtual and physical environment integration system (VPEIS) for dynamically integrating a virtual environment with a physical environment are provided. The VPEIS receives dimensions and an orientation of the physical environment, and a user device's reference position in the physical environment. The VPEIS dynamically integrates the virtual environment with the physical environment on the user device by orienting the virtual environment relative to the orientation of the physical environment and the user device's reference position, dynamically updating a position, a movement including a user's step, and a direction of movement of the user device in the oriented virtual environment using sensors internal to the user device, and dynamically tracking a position, a movement, and a direction of movement of virtual objects and the user device, interactions between the virtual objects, and interactions of the virtual objects with the user device in the oriented virtual environment.

22 Claims, 11 Drawing Sheets

Related U.S. Application Data

(60) Provisional application No. 62/059,713, filed on Oct. 3, 2014.

(51) Int. Cl.
*G06F 3/01* (2006.01)
*G06F 3/04842* (2022.01)
*G06F 3/04847* (2022.01)

(52) U.S. Cl.
CPC ...... *G06F 3/04842* (2013.01); *G06F 3/04847* (2013.01); *G06T 2200/24* (2013.01)

(58) Field of Classification Search
CPC .... G06F 3/012; G06F 3/04815; G06F 3/0487; G02B 2027/0138; G02B 2027/014; G02B 2027/0178; G02B 2027/0187; G02B 27/0093; G02B 27/017; G02B 27/0172; G02B 27/0176
See application file for complete search history.

(56) References Cited

U.S. PATENT DOCUMENTS

| | | | |
|---|---|---|---|
| 8,506,404 B2 | 8/2013 | Distanik et al. | |
| 8,675,017 B2 | 3/2014 | Rose et al. | |
| 8,687,021 B2 | 4/2014 | Bathiche et al. | |
| 8,717,294 B2 | 5/2014 | Weising et al. | |
| 8,761,811 B2 | 6/2014 | Alonzo | |
| 8,777,752 B2 | 7/2014 | Hall | |
| 8,810,600 B2 | 8/2014 | Bohn et al. | |
| 8,827,717 B2 | 9/2014 | Pope et al. | |
| 8,839,121 B2 | 9/2014 | Bertolami et al. | |
| 9,123,171 B1* | 9/2015 | Chavez | G06T 3/40 |
| 9,703,369 B1* | 7/2017 | Mullen | A63F 13/843 |
| 10,943,395 B1* | 3/2021 | Green | G06F 3/04847 |
| 2001/0007825 A1 | 7/2001 | Harada et al. | |
| 2002/0154214 A1 | 10/2002 | Scallie et al. | |
| 2003/0218638 A1 | 11/2003 | Goose et al. | |
| 2005/0073531 A1 | 4/2005 | Kuroki et al. | |
| 2007/0218988 A1 | 9/2007 | Lucich | |
| 2008/0280676 A1 | 11/2008 | Distanik et al. | |
| 2009/0005140 A1 | 1/2009 | Rose et al. | |
| 2009/0046140 A1 | 2/2009 | Lashmet et al. | |
| 2009/0187389 A1 | 7/2009 | Dobbins et al. | |
| 2009/0215536 A1 | 8/2009 | Yee et al. | |
| 2012/0200600 A1 | 8/2012 | Demaine | |
| 2012/0268563 A1 | 10/2012 | Chou et al. | |
| 2013/0065692 A1 | 3/2013 | Aronzon et al. | |
| 2013/0083061 A1 | 4/2013 | Mishra et al. | |
| 2013/0120224 A1* | 5/2013 | Cajigas | G06F 3/013 345/8 |
| 2013/0128364 A1 | 5/2013 | Wheeler | |
| 2013/0196773 A1 | 8/2013 | Lockeby et al. | |
| 2013/0249947 A1 | 9/2013 | Reitan | |
| 2013/0335301 A1 | 12/2013 | Wong | |
| 2014/0002443 A1* | 1/2014 | Cunningham | G06T 19/006 345/419 |
| 2014/0002444 A1 | 1/2014 | Bennett et al. | |
| 2014/0002494 A1 | 1/2014 | Cunningham | |
| 2014/0016825 A1* | 1/2014 | Kasahara | G06T 7/20 382/103 |
| 2014/0018094 A1 | 1/2014 | Oren et al. | |
| 2014/0063061 A1 | 3/2014 | Reitan | |
| 2014/0063063 A1 | 3/2014 | Scott et al. | |
| 2014/0218291 A1* | 8/2014 | Kirk | G06T 7/70 345/158 |
| 2014/0221090 A1 | 8/2014 | Mutschler et al. | |
| 2014/0225918 A1 | 8/2014 | Mihal et al. | |
| 2014/0247280 A1 | 9/2014 | Nicholas | |
| 2014/0270346 A1 | 9/2014 | Tsin et al. | |
| 2014/0285522 A1 | 9/2014 | Kim | |
| 2014/0315603 A1 | 10/2014 | Fathollahi et al. | |
| 2014/0333666 A1* | 11/2014 | Poulos | G02B 27/017 345/633 |
| 2014/0369559 A1 | 12/2014 | Liu et al. | |
| 2014/0372944 A1 | 12/2014 | Mulcahy | |
| 2014/0375679 A1* | 12/2014 | Margolis | G09G 3/3208 345/633 |
| 2015/0022434 A1 | 1/2015 | Matas | |
| 2015/0091780 A1* | 4/2015 | Lyren | G02B 27/017 345/8 |
| 2015/0254881 A1 | 9/2015 | Duan | |
| 2015/0356788 A1* | 12/2015 | Abe | A63F 13/335 345/633 |
| 2015/0363966 A1* | 12/2015 | Wells | G06F 3/04815 345/419 |
| 2015/0363967 A1 | 12/2015 | Wells et al. | |
| 2016/0027212 A1 | 1/2016 | Da Veiga | |
| 2016/0080732 A1 | 3/2016 | Pedley et al. | |
| 2016/0104452 A1* | 4/2016 | Guan | G06F 3/0304 345/633 |
| 2016/0180593 A1 | 6/2016 | Yang | |
| 2016/0307374 A1* | 10/2016 | Kurz | G06F 3/012 |

* cited by examiner

DYNAMIC INTEGRATION OF A VIRTUAL ENVIRONMENT WITH A PHYSICAL ENVIRONMENT

CROSS-REFERENCE TO RELATED APPLICATIONS

This application is a continuation of U.S. Application Ser. No. 14/872,168, titled "DYNAMIC INTEGRATION OF A VIRTUAL ENVIRONMENT WITH A PHYSICAL ENVIRONMENT", filed on Oct. 1, 2015 which claims priority to and the benefit of provisional patent application No. 62/059,713 titled "FRAMEWORK FOR COMBINING VIRTUAL AND PHYSICAL WORLDS", filed in the United States Patent and Trademark Office on Oct. 3, 2014. The specifications of the above referenced patent applications are incorporated herein by reference in their entireties, including all references and appendices cited therein, for all purposes.

BACKGROUND

A virtual reality experience is a game, narrative, or other experience that occurs within a simulated world. Some conventional systems immerse a user in a virtual world entirely, with no references to a physical world around them. Other conventional systems combine a real world and a computer generated virtual world together on a display unit. Such systems typically operate in real time with real world objects and provide interactive functionality between the real world objects and virtual world objects. Conventional systems that combine the real world and the virtual world map changes in a user's real world orientation to changes in a virtual world orientation, and are specifically designed to visualize and manage virtual reality environments. However, these systems are limited to establishing the virtual experience in a confined location at a given instance of time. User devices, for example, mobile phones, tablets etc., contain multiple different sensors that are useful in determining their position and movement. Therefore, there is a need for implementing a virtual reality system on a user device that coordinates the sensors of the user device to create a virtual reality experience arbitrarily in any physical space or physical location and map even small changes in a user's physical position to a change in the user's virtual position.

Virtual reality systems have been used in various fields to simulate a real world scenario, for example, to train military personnel and law enforcement personnel, to simulate medical structures in the healthcare industry, etc. However, these implementations of the virtual reality systems are limited to large scale industries due to high initial implementation costs. The conventional virtual reality systems are typically hardwired or tethered to a computing device which isolates the virtual reality system to a limited space. The high initial implementation costs and the immobility of the virtual reality system limit a widespread implementation of virtual reality technology. Moreover, there is a need for creating a realistic virtual world with an optimized virtual reality experience that can be used to train people in various fields without having to create a real world scenario solely for the purpose of training.

Conventional systems that merge a virtual world with a real world utilize external cameras to identify a location and multiple additional devices accessible via a network to determine dimensions of a virtual environment. The requirement for additional devices increases implementation requirements and operating costs. There is a need for a virtual reality system that can operate without access to a network and that does not require additional devices to function at any location in the real world, including at locations that lack any specific landmark. Another conventional virtual reality system establishes a virtual environment in a vehicle and precludes the user from utilizing the virtual reality system outside the vehicle, thereby limiting the scope of the area of operation of the virtual reality system. There is a need for a virtual reality system that can establish a virtual environment at any location in any arbitrary space, thereby allowing a user to utilize the virtual reality system in any arbitrary space.

Some conventional virtual reality systems utilize image processing and more than one device to establish and calibrate a view of a virtual environment. There is a need for a virtual reality system that can function without the use of additional devices to establish and calibrate a view of a virtual environment. Moreover, systems that rely exclusively on image processing to recognize a landmark cannot operate in areas of low light or areas in which a background changes, for example, when people or objects move in the area. Therefore, there is a need for a system that can maintain a virtual world within a real space without depending on image processing. Other conventional virtual reality systems receive virtual environment data to be integrated into a physical environment via a communication network which adds additional latency to the overall system. There is a need for a virtual reality system that is self-contained within a single user device.

Another conventional virtual reality system utilizes geo-location information to determine a user's position and utilizes, for example, global positioning system (GPS) sensors and wireless network sensors to determine the movement of the user. However, on standard consumer models of user devices, the GPS sensors and the wireless network sensors are not precise and accurate enough to recognize a user's position change of about a few feet, that is, a length of a common step. Moreover, GPS signals are generally not received indoors. Therefore, there is a need for accurately determining a user's movements and small positional changes and translating the user's movements and positional changes into the virtual environment. Another conventional virtual reality system establishes a virtual environment within a physical environment by building a database of visual cues of surrounding objects. There is a need for a virtual reality system that can establish a virtual environment within a physical environment without the need for maintaining and managing a database. Other conventional virtual reality systems require external positioning technologies, for example, Wi-Fi® beacons of Wi-Fi Alliance Corporation to identify a user's position, and require tracing of walls and edges of a room with a user device as well as affixing radio frequency identification tags to real objects that should be represented in the virtual environment. There is a need for a virtual reality system that establishes a virtual environment without the need for additional external positioning technologies and identification devices.

Hence, there is a long felt but unresolved need for a computer implemented method and a virtual and physical environment integration system implemented on a user device that dynamically integrate a virtual environment with a physical environment on the user device. Moreover, there is a need for a computer implemented method and a virtual and physical environment integration system implemented on a user device that utilize and communicate with existing devices and sensors internal to the user device to overlay a virtual environment on a user's physical environment, accurately determine a user's position and movements including small positional changes at any physical location, and dynamically map the user's position and movements in the physical environment to the user's position and movements in the virtual environment for dynamically enhancing integration of the virtual environment with the physical environment, without the need for external additional devices and external positioning technologies. Furthermore, there is a need a computer implemented method and a virtual and physical environment integration system implemented on a user device that operate without access to a network and that can function at any location in any arbitrary space in the world, including at locations that lack any specific landmark.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended to determine the scope of the claimed subject matter.

The computer implemented method and the virtual and physical environment integration system (VPEIS) disclosed herein address the above mentioned needs for dynamically integrating a virtual environment with a physical environment on a user device. Moreover, the computer implemented method and the VPEIS disclosed herein are implemented on a user device and utilize and communicate with existing devices and sensors internal to the user device to overlay a virtual environment on a user's physical environment, accurately determine a user's position and movements including small positional changes at any physical location, and dynamically map the user's position and movements in the physical environment to the user's position and movements in the virtual environment for dynamically enhancing integration of the virtual environment with the physical environment, without the need for external additional devices and external positioning technologies. The computer implemented method and the VPEIS disclosed herein generates an immersive virtual environment on a user device, in which the virtual environment is overlaid upon the physical environment on the user device and in which the user device is implemented as a window into the integrated virtual environment. Furthermore, the computer implemented method and the VPEIS disclosed herein can operate on the user device without access to a network and can function at any location in any arbitrary space in the world, including at locations that lack any specific landmark.

The virtual and physical environment integration system (VPEIS) disclosed herein implemented on the user device enhances user interactions with the physical environment. The VPEIS maintains positions and behaviors of virtual objects in the virtual environment within the user device itself, for example, similar to a video game, and overlays the results upon a camera view on the user device. The VPEIS coordinates the sensors internal to the user device to track the user's change in position. The VPEIS establishes boundaries of the virtual environment within the physical environment without the need for additional devices, for example, beacons and other positioning technologies and without the need for defining the boundaries of the physical environment, for example, a room by entering a schematic or by a tracing a device along edges of the room.

The computer implemented method disclosed herein employs the virtual and physical environment integration system (VPEIS) executable by at least one processor configured to execute computer program instructions for dynamically integrating a virtual environment with a physical environment on a user device. The VPEIS receives and processes dimensions of the physical environment from the user device. The VPEIS receives and processes a reference position of the user device in the physical environment and an orientation of the physical environment from the user device. The VPEIS dynamically integrates the virtual environment retrieved from the user device with the physical environment on the user device by processing and transforming the received and processed dimensions of the physical environment, the received and processed reference position of the user device in the physical environment, the received and processed orientation of the physical environment, and the retrieved virtual environment.

The virtual and physical environment integration system (VPEIS) performs the integration of the virtual environment with the physical environment on the user device as follows: The VPEIS orients the retrieved virtual environment relative to the received and processed orientation of the physical environment and the received and processed reference position of the user device in the physical environment to fit the retrieved virtual environment within the physical environment and render virtual objects of the retrieved virtual environment within the physical environment. The VPEIS, in communication with one or more of multiple sensors internal to the user device, determines a position of the user device, a movement comprising each step taken by a user of the user device, and a direction of movement of the user device in the physical environment. The VPEIS, in communication with one or more of the sensors of the user device, dynamically updates the position, the movement comprising each step taken by the user, and the direction of movement of the user device in the oriented virtual environment. The VPEIS, in communication with one or more of the sensors of the user device, dynamically tracks a position, a movement, and a direction of movement of each of the rendered virtual objects and the user device, interactions between the rendered virtual objects, and interactions of the rendered virtual objects with the user device in the oriented virtual environment for triggering events in the oriented virtual environment. In an embodiment, the VPEIS dynamically adjusts audio of the rendered virtual objects in the oriented virtual environment based on the dynamically tracked position, movement, and direction of movement of each of the rendered virtual objects relative to the position of the user device.

The virtual and physical environment integration system (VPEIS) provides a framework that optimizes creation of three-dimensional (3D) virtual reality experiences on user devices. The VPEIS allows the user to size and orient the virtual environment within the physical environment of an arbitrary size. The VPEIS allows a user to view the virtual environment on the user device, and translates the user's movements within the physical environment into a simulated environment that creates a sensation of being within the virtual environment. Since user devices, for example, smart phones, tablets, etc., are not tethered to other hardware devices, for example, a television (TV) or a computer, the VPEIS implemented in the user device allows the user to change a physical position or location by walking with the user device. The VPEIS monitors the user's position with sufficient precision such that a physical step made by the user in the physical environment can be estimated and translated into a physical step in the virtual environment, thereby enabling the user to move about in an arbitrarily large space in the physical environment and to have that same movement translated into the virtual environment. Moreover, since a user device is not bound to a fixed location, the virtual environment generated by the VPEIS on the user device can be located anywhere the user device is operated. The VPEIS therefore orients the virtual environment within a specific geolocation or any arbitrary physical environment, depending on requirements of a virtual experience. The VPEIS is a framework upon which virtual experiences are built. The VPEIS implements methods for establishing a virtual environment within a physical space and for updating a virtual environment as a user moves in the physical environment. The VPEIS executes the mechanics of integrating the virtual environment with the physical environment, thereby allowing developers of new virtual experiences to focus on characters and interactions that make each virtual experience unique.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
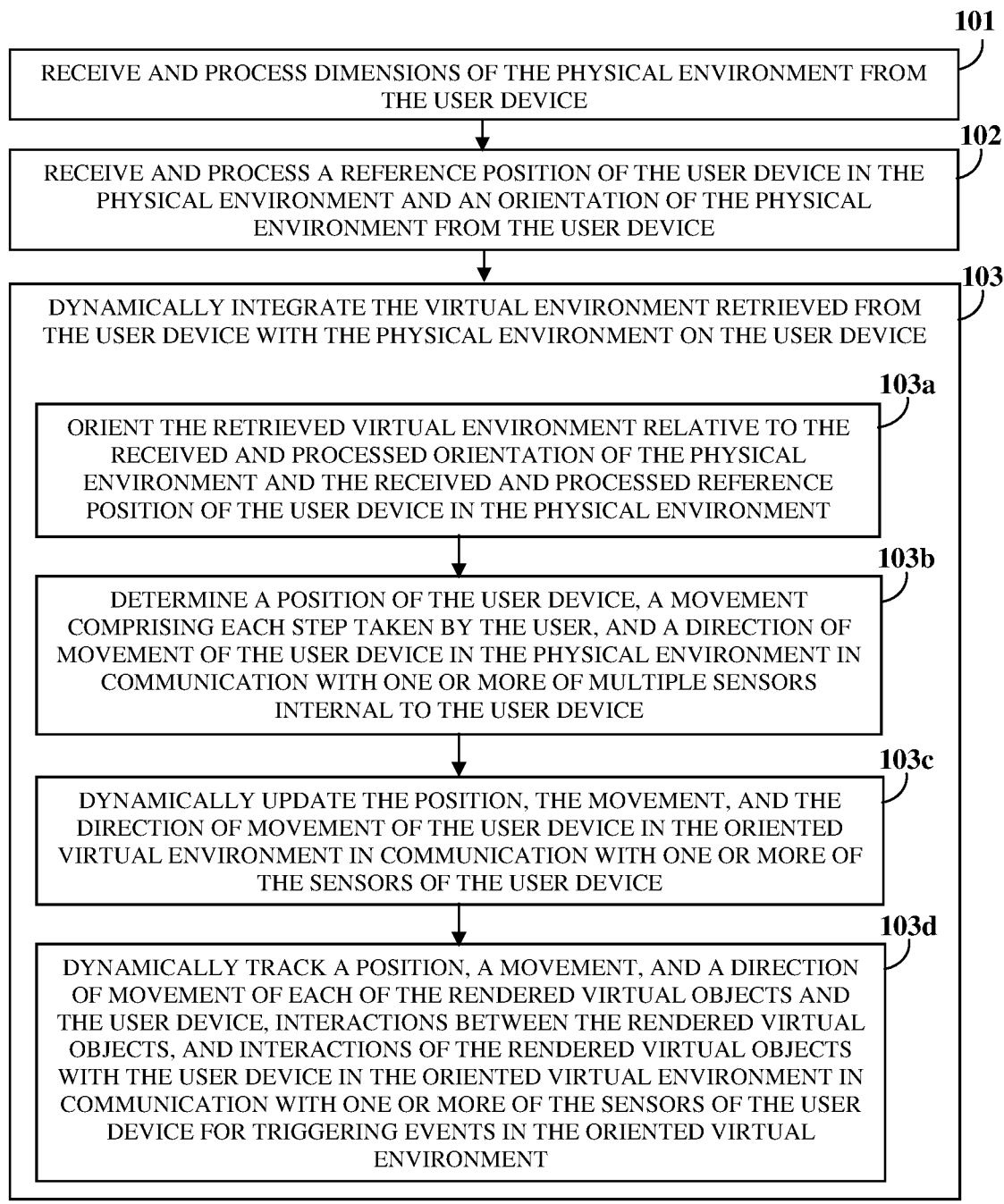
FIG. 1 illustrates a computer implemented method for dynamically integrating a virtual environment with a physical environment on a user device.

FIG. 1 illustrates a computer implemented method for dynamically integrating a virtual environment with a physical environment on a user device. As used herein, "physical environment" refers to a real world environment or a physical world in which a user is physically located. Also, as used herein, "virtual environment" refers to a non-physical or computer simulated environment or a virtual world in which virtual objects are simulated in a real world or imagined worlds. Also, as used herein, "virtual objects" refer to computer simulated objects, for example, three-dimensional characters of a game created in the virtual environment, avatars, or virtual representations of other user devices, etc., that interact with the user for a virtual experience. Also, as used herein, "integrating a virtual environment with a physical environment" refers to combining aspects of virtual worlds or virtual environments and a physical world or a physical environment to create an illusion that the virtual environment and the physical environment are a unique entity, such that movements, for example, walking and turning in the physical environment result in movements in the virtual environment. In the computer implemented method disclosed herein, integration comprises, for example, merging, bridging, weaving, or otherwise combining aspects of a virtual environment with a representation of a physical environment, and creating a hybridized view that is partially representative of the virtual environment and partially representative of the physical environment. The user device is a mobile computing device, for example, a mobile phone, a tablet computing device, a smart phone, a wearable computing device such as the Google Glass™ of Google Inc., the Apple Watch® of Apple Inc., etc., a gaming device, etc. The computer implemented method disclosed herein provides a framework that optimizes common mechanics of a virtual experience from specifics of a particular application. The virtual experience can be implemented on multiple different user devices for applications comprising, for example, games, demonstrations, narratives such as virtual reality movies, sports, advertisements, augmented reality applications, etc. The computer implemented method disclosed herein combines a visual representation of a physical environment, for example, a video stream or an image of the physical environment with virtual objects of a virtual environment such that the virtual objects of the virtual environment appear to exist in three dimensions in the physical environment.

The computer implemented method disclosed herein employs a virtual and physical environment integration system (VPEIS) executable by at least one processor configured to execute computer program instructions for dynamically integrating a virtual environment with a physical environment on a user device. In an embodiment, the VPEIS is configured as a mobile application downloadable on a user device configured to perform functions of the VPEIS. In another embodiment, the VPEIS is a multi-platform software application configured to be implemented on multiple operating systems, for example, the iOS of Apple Inc., the Android® operating system of Google Inc., installed on the user device.

A user initializes the virtual and physical environment integration system (VPEIS) on the user device via a graphical user interface (GUI) provided by the VPEIS on the user device. The VPEIS establishes a virtual environment in any arbitrary space of multiple different sizes. The VPEIS establishes a boundary of the virtual environment within a physical environment of an arbitrary size, an arbitrary location, and an arbitrary orientation on the user device. The VPEIS requires dimensions of the physical environment, an initial reference position of the user device, and the orientation of the virtual environment for fitting the virtual environment within the physical environment. In an embodiment, the physical environment can have an arbitrary size, the dimensions of which are defined by the user. In the computer implemented method disclosed herein, when a user initializes the VPEIS, the VPEIS prompts the user to enter dimensions of the physical environment via the GUI. As used herein, the term "dimensions" refers to measurements of a size, for example, a length, a height, a width, etc., of a physical area or a physical space that defines a boundary of the physical environment. In an embodiment, the VPEIS prompts the user to select a size for the physical environment from a series of predefined physical spaces, that is, available real world spaces of specific dimensions, for example, athletic arenas such as a tennis court, a basketball court, a football field, a living room, a soccer field, etc., on the GUI. In another embodiment, the VPEIS renders standard user interface widgets on the GUI to allow the user to enter the dimensions of the physical environment. The VPEIS records the entered dimensions. The VPEIS receives and processes 101 the dimensions of the physical environment from the user device. The VPEIS receives the dimensions of the physical environment, for example, from one or more of user inputs, the user interface widgets, and a user selection of one or more of multiple predefined physical spaces with predefined dimensions via the GUI.

The virtual and physical environment integration system (VPEIS) also prompts the user to specify a reference position of the user device, that is, a location of the user within the physical environment. As used herein, "reference position" refers to an initial position of the user device around which the virtual environment is oriented. The reference position is a point common to both the virtual environment and the physical environment. In an embodiment, the VPEIS displays a graphical representation of the physical environment on the graphical user interface (GUI) to allow the user to touch a spot where he/she is located on the displayed graphical representation on the GUI. The VPEIS records the specified coordinates relative to the received and processed dimensions of the physical environment. In another embodiment, the VPEIS renders a predefined set of specific locations, for example, four corners of a rectangular physical environment on the GUI and then directs the user to select one of the predefined set of specific locations and walk to the selected location, as the corners are easily recognizable. The predefined set of specific locations comprises recognizable milestones within the physical environment.

In another embodiment, the virtual and physical environment integration system (VPEIS) utilizes location sensors, for example, global positioning system (GPS) sensors of the user device to determine a geolocation of the user device, where the determined geolocation defines the reference position of the user device. The VPEIS receives and processes 102 the reference position of the user device in the physical environment and an orientation of the physical environment from the user device. In an embodiment, the VPEIS receives the reference position from user inputs and/or a user selection of one or more of multiple predefined locations within a physical space via the graphical user interface (GUI). In another embodiment, the VPEIS receives the reference position from geolocation information retrieved from location sensors internal to the user device.

In an embodiment, the virtual and physical environment integration system (VPEIS) displays an image or video feed from an image capture device, for example, a camera of the user device on the GUI to allow the user to view the physical environment from a perspective of the image capture device and orient the physical environment. The VPEIS prompts the user to establish the virtual environment in a safe physical environment. The virtual environment and virtual objects associated with the virtual environment are stored in a memory unit of the user device, for example, when the user downloads the VPEIS configured as a mobile application on the user device. The VPEIS retrieves the virtual environment with the virtual objects from the memory unit of the user device for performing integration of the retrieved virtual environment with the physical environment. Within the virtual environment, the virtual objects move, collide, emit sounds, respond to the user, and perform other interactions. The VPEIS dynamically integrates 103 the retrieved virtual environment with the physical environment on the user device by processing and transforming the received and processed dimensions of the physical environment, the received and processed reference position of the user device in the physical environment, the received and processed orientation of the physical environment, and the retrieved virtual environment. To perform the integration, the VPEIS performs the steps 103*a*, 103*b*, 103*c*, and 103*d* exemplarily illustrated in FIG. 1 and disclosed below.

The virtual and physical environment integration system (VPEIS) orients 103*a* the retrieved virtual environment relative to the received and processed orientation of the physical environment and the received and processed reference position of the user device in the physical environment to fit the retrieved virtual environment within the physical environment and render the virtual objects of the retrieved virtual environment within the physical environment. In an embodiment, the VPEIS performs the orientation by rendering images of the physical environment captured by one or more image capture devices of the user device on the graphical user interface (GUI), overlaying a boundary of the retrieved virtual environment on the rendered images of the physical environment, and aligning the overlaid boundary of the retrieved virtual environment with the boundary of the physical environment during rotations of the user device to determine a compass bearing at which the overlaid boundary of the retrieved virtual environment and the boundary of the physical environment align. The VPEIS overlays the boundary of the virtual environment on top of a camera display of the physical environment on the GUI. The VPEIS directs the user to turn his/her body, and when the user turns, the VPEIS renders changes in the physical environment on the camera display on the GUI as the user rotates, while retaining the boundary of the virtual environment in a fixed position. The VPEIS directs the user to rotate until the boundary of the overlaid virtual environment is aligned with the boundary of the physical environment and to acknowledge that the virtual environment and the physical environment align. When the user acknowledges the alignment of the virtual environment and the physical environment, the VPEIS records the compass bearing where the virtual environment and the physical environment align. In an embodiment, the VPEIS identifies the boundary of the physical environment as the user moves or turns, using image recognition techniques, to avoid the user from having to manually acknowledge when the boundaries of the physical environment and the virtual environment align. A generic computer using a generic program cannot orient the virtual environment relative to the orientation of the physical environment in accordance with the method steps disclosed above.

User devices comprise sensors, for example, accelerometers, compass sensors, a gyroscope, global positioning system sensors, wireless network sensors, location sensors, an altimeter, one or more image capture devices, etc. An accelerometer in the user device measures acceleration of the user device in multiple dimensions. The virtual and physical environment integration system (VPEIS) uses the accelerometer in the user device to determine the orientation of the user device relative to the ground. In an embodiment, the VPEIS computes a rate of movement of the user device using the accelerometer and/or other inertial sensing devices. A compass sensor in the user device measures the orientation of the user device relative to the earth's magnetic field. The VPEIS uses the compass sensor in the user device to determine a direction of the physical environment in which the user device is facing. In an embodiment, the VPEIS determines the direction of the user's travel in the physical environment using the compass sensor and/or other direction sensing devices.

The sensors of the user device generate data points which may contain significant noise. In an embodiment, the virtual and physical environment integration system (VPEIS) filters noise from the data received from the sensors of the user device. The VPEIS implements signal processing filters on the data received from the sensors of the user device to filter the noise and identify true data signals. The frequency of the noise is different for different user devices, and therefore the VPEIS optimally adjusts the signal processing filters for application on different user devices. The VPEIS updates the effects of the signal processing filters to optimize the performance of a particular user device. In an embodiment, the VPEIS allows a user to manually adjust settings that amplify or attenuate the effect of the signal processing filters via the graphical user interface (GUI), thereby optimizing the performance of a particular user device. By adjusting the settings, the VPEIS allows the user to control the stability of the virtual environment rendered on the GUI of the user device. Even though a low setting or weight causes the virtual environment to be less stable, that is, more jittery, the low setting allows the virtual environment to be more responsive to the movement of the user device in the physical environment. A high setting or weight causes the virtual environment to be more stable, but less responsive to the movement of the user device in the physical environment. In an embodiment, based on the user's adjustment of the settings, the VPEIS affects a moving average filter that is applied to the sensors, for example, the accelerometers, the compass sensors, etc., of the user device. When the setting is low, the moving average filter averages across a smaller number of data points. When the setting is high, the number of data points is larger.

When the virtual and physical environment integration system (VPEIS) identifies true signals comprising generally filtered or noiseless sensor data from the sensors of the user device, the VPEIS uses the filtered sensor data, for example, readings of the accelerometer and the compass sensor, to obtain a rotation matrix that defines a rotation of the user device. As used herein, "rotation matrix" refers to a numerical representation of an arbitrary rotation of axes about an origin. That is, for orienting the virtual environment relative to the received and processed orientation of the physical environment and the received and processed reference position of the user device in the physical environment, the VPEIS utilizes a rotation matrix that defines a rotation of the user device, created using motion data from one or more of the sensors of the user device. The rotation matrix mathematically describes the rotation of the device. The VPEIS applies the rotation matrix through computing libraries to redraw the virtual environment. In an embodiment, the VPEIS transforms the data from the sensors of the user device into the rotation matrix, for example, through published operating system application programing interfaces (APIs), and then, using published open graphics library (OpenGL) APIs, the VPEIS utilizes the rotation matrix to redraw or update the virtual environment relative to the physical environment. In an embodiment, the VPEIS configures the user device to calculate the rotation matrix using operating system application programming interfaces (APIs) or third party APIs. The VPEIS retrieves the calculated rotation matrix by calling the APIs and then applies the calculated rotation matrix to an image capture device, for example, the camera of a game engine through the OpenGL to avoid manual implementation by developers. Through this process, the orientation of the user device relative to the physical environment can be used to update the orientation of the user device relative to the virtual environment, thereby allowing the appearance of the orientations of the virtual environment and the physical environment to be the same as the user device moves. The VPEIS therefore creates a visual illusion that the user is surrounded by the virtual environment.

In an embodiment, the virtual and physical environment integration system (VPEIS) updates the orientation of the retrieved virtual environment relative to the received and processed orientation of the physical environment on the user device based on an update to the reference position of the user device at any time instant. A generic computer using a generic program cannot update the orientation of the retrieved virtual environment relative to the received and processed orientation of the physical environment on the user device based on an update to the reference position of the user device at any time instant in accordance with the method steps disclosed above. The VPEIS encapsulates the entire orientation process, including the application of the signal processing filters and the ability to manually adjust them, within a framework to preclude manual implementation by developers. The VPEIS then renders the virtual environment within the physical environment since the VPEIS on the user device knows the dimensions of the physical environment, the user's position within both the physical environment and the virtual environment, and the orientation of the virtual environment relative to the physical environment.

In the computer implemented method as disclosed above, the virtual and physical environment integration system (VPEIS) defines a physical environment having a length and a width, defines a virtual environment that has a length and a width that correspond in size to the physical environment, and generates for display, an integrated virtual environment comprising a view of the physical environment that is integrated with a view of the virtual environment, where the virtual environment comprises virtual objects that are integrated into the view of the physical environment such that the virtual objects appear to reside in the physical environment. The "integrated virtual environment" hereafter refers to the virtual environment dynamically integrated with the physical environment. In this integrated virtual environment, each of the virtual objects appears to have a depth. The VPEIS continually updates the integrated virtual environment as a user moves through the physical environment while interacting with the virtual objects in the integrated virtual environment. The integrated virtual environment comprises both dimensions and features of the physical environment combined with the dimensions and features of the virtual environment. As users view and interact with a view of the physical environment via the graphical user interface (GUI) on a display unit of the user device, the VPEIS overlays aspects of the virtual environment onto the view of the physical environment that is displayed to the user via the GUI. The VPEIS establishes a virtual environment within any open physical space using the sensors internal to the user device and maps changes in the user's physical position in the open physical space, even small positional changes of, for example, about a few feet, that is, the length of a common step, to a change in the user's virtual position in the virtual environment. The VPEIS encapsulates the above mentioned functionalities within a single framework, thereby optimizing the creation of virtual experiences.

Some virtual experiences are designed to take place in a specific physical location somewhere in the world. In an embodiment, to orient the virtual environment in a specific physical location based on geolocation information and to initialize such a virtual experience, the virtual and physical environment integration system (VPEIS) determines the position and the orientation of the user device within that specific physical location. Global positioning system (GPS) sensors and wireless network sensors in the user device provide the position of the user device within that specific physical location, and the compass sensors identify the orientation of the user device within that specific physical location. The VPEIS then uses this position and orientation information to construct the virtual environment to fit within the designated physical location. Some virtual experiences can take place in different safe open physical spaces or areas of different sizes. In another embodiment, to orient the virtual environment in an arbitrary open physical space and to initialize such a virtual experience, the VPEIS determines the size of the open physical space, the user's initial position in the open physical space, and the orientation of the virtual environment to fit the virtual environment within the open physical space as disclosed in the detailed description of FIGS. 4C-4G.

In an embodiment, for some applications, the virtual and physical environment integration system (VPEIS) does not visually combine the virtual environment with the physical environment to create an integrated virtual environment. For some virtual experiences, the display is entirely virtual; that is, a user cannot view any part of the physical environment through the graphical user interface (GUI) on a display unit of the user device. In this embodiment, the VPEIS still establishes the virtual environment within the physical environment. In this embodiment, the background is a depiction of the virtual environment instead of the feed from the image capture device of the user device.

The user is free to move from his/her initial reference position by walking in the physical environment while carrying the user device. During the integration of the virtual environment with the physical environment on the user device, the virtual and physical environment integration system (VPEIS), in communication with one or more of multiple sensors internal to the user device, also determines 103b a position of the user device, a movement comprising each step taken by the user, and a direction of movement of the user device in the physical environment. When the virtual environment is coextensive in size to the physical environment, the movement of the user device in the physical environment is directly proportional to the movement of the user in the virtual environment that is overlaid on the view of the physical environment on the graphical user interface (GUI). In an embodiment, the virtual environment and the physical environment are not coextensive in size. For example, the virtual environment may be smaller or larger than the physical environment delineated by the user.

In an embodiment, the virtual and physical environment integration system (VPEIS) detects the movement of the user device in the physical environment from a physical movement of the user device in the physical environment. In another embodiment, the VPEIS detects the movement of the user device in the physical environment from a movement received via an interface element on the graphical user interface (GUI). As used herein, "interface element" refers to a software implemented input object, for example, a virtual joystick, a virtual scroller, etc., provided on the GUI that is capable of receiving an input from a user or capturing an application of pressure from the user for simulating movement of the user device. The user moves around in the physical environment to move in the virtual environment. The virtual experience generated by the VPEIS requires safe, open physical spaces or areas to allow the user to play. In an active mode, the user changes his/her position in the virtual environment by physically moving in the physical environment. As an open physical space may not be available, in an embodiment, the VPEIS provides a stationary mode to provide an alternative mode of movement to the user. In this embodiment, when the user switches the VPEIS from the active mode to the stationary mode, the VPEIS renders a previously hidden interface element, for example, a virtual joystick on the GUI to allow the user to remain stationary but provide movement through the interface element. The interface element can be used to change the user's position in the virtual environment without requiring the user to move in the physical environment. For example, when the user presses the virtual joystick for an upward movement or a downward movement, the VPEIS translates the upward movement or the downward movement of the virtual joystick into a forward movement or a backward movement of the user in the virtual environment. Further, in this example, when the user presses the virtual joystick for a left movement or a right movement, the VPEIS translates the left movement or the right movement of the virtual joystick to a rotation of the user in the virtual environment. In this manner, the user uses the interface element on the GUI to traverse through the virtual environment, while remaining stationary in the physical environment.

In an embodiment, the virtual and physical environment integration system (VPEIS) determines the user's height by prompting the user to enter his/her height, for example, using user interface (UI) widgets on the graphical user interface (GUI). In an embodiment, the VPEIS performs height determination once at the beginning of the virtual experience. From the height of the user, the VPEIS determines the distance of a user's step, for example, as a ratio of the user's height. As a user takes a step, the VPEIS in the user device monitors the output of an internal accelerometer or a similar sensor and identifies sequences in the output data that match a pattern of a step. In this embodiment, the VPEIS receives and processes the height of the user to determine the distance covered in a single step by the user in the physical environment for the determination of the position of the user device, the movement comprising each step taken by the user, and the direction of movement of the user device in the physical environment.

In an embodiment, the virtual and physical environment integration system (VPEIS) combines the user's height, the user's steps determined and tracked by the VPEIS, for example, by matching accelerometer output data with an oscillating pattern, and directional data, for example, from a compass sensor to track a user's position and update the virtual environment. The VPEIS dynamically tracks changes in the position, the movement, and the direction of movement of the user device in the physical environment to update the position of the user's avatar in the virtual environment synchronously by using a combination of the received and processed height of the user, each step taken by the user and tracked by the VPEIS in communication with one or more of the sensors of the user device, and the direction of movement of the user device in communication with one or more of the sensors, for example, the accelerometers, the compass sensors, the gyroscope, etc., of the user device. The VPEIS dynamically updates the dynamically tracked position, movement, and direction of movement of the user device in the oriented virtual environment. The VPEIS configures how sensors in the user device can be used to separate steps of a user from noise produced by other motion. A generic computer using a generic program cannot dynamically track changes in the user's position, the movement comprising each step taken by the user, and the direction of the movement of the user device in the physical environment using a combination of the received and processed height of the user, each step taken by the user of the user device and tracked by the VPEIS in communication with one or more of the sensors of the user device, and the direction of the movement of the user device determined by the VPEIS in communication with one or more of the sensors of the user device, and dynamically update the dynamically tracked position, the movement, and the direction of movement of the user device in the oriented virtual environment synchronously in accordance with the method steps disclosed above.

In an embodiment, the virtual and physical environment integration system (VPEIS) determines the height of the user using a sensor, for example, an altimeter in the user device, after which the VPEIS approximates the height and step size of the user. To recognize a user's position change of, for example, about a few feet, that is, about the length of a common step, the VPEIS utilizes a combination of two or more of the sensors, for example, the accelerometers, the compass sensors, the global positioning system (GPS) sensors, one or more image capture devices such as cameras, etc., in the user device. The VPEIS uses the accelerometer of the user device to recognize the movement of the user device when the user takes a step. The accelerometer in the user device measures changes in the user device's movement relative to gravity, and in the course of a typical step, these changes take the form of an oscillating wave. The VPEIS monitors the sensor data and if the VPEIS recognizes an oscillating pattern, the VPEIS determines that a step has been taken. The precision of the measurement can be a fraction of a step as the data needs to match only a portion of the oscillating pattern, for example, a rise to a crest or a descent into a trough. This method identifies a user's change in position more quickly and precisely than the GPS capability of existing devices such as standard phones and tablets. After the VPEIS recognizes a step, the VPEIS determines the direction of the step using the directional sensors, for example, the compass sensors of the user device. In an embodiment, the VPEIS assumes that the user is walking forward in the direction of a compass heading. Furthermore, the accelerometer of the user device provides information about the orientation of the user device by measuring acceleration in three dimensions. The VPEIS utilizes the information from the accelerometer of the user device to determine whether the user device is moving in the same direction of gravity or in an opposite direction of gravity. As the user walks, the user device moves in the same direction as gravity or in the opposite direction of gravity in an oscillating wave pattern, and the VPEIS detects this oscillating wave pattern in the information received from the accelerometer of the user device. The VPEIS matches the user device's motion relative to gravity against an oscillating wave pattern. If the sensor output data matches the oscillating wave pattern, the VPEIS determines that a step is taken. If the sensor output data does not match the oscillating wave pattern, then the VPEIS determines that user device is being moved in other ways, for example, side to side or up and down.

While the accelerometer data is useful for identifying a step, the accelerometer data is typically not precise enough to determine the direction of that step or the distance that step covers. Therefore, the virtual and physical environment integration system (VPEIS) acquires additional information to recognize the position of the user after that step. In an embodiment, to determine the distance covered in a single step, the VPEIS implements a heuristic technique based on the height of the user. At the beginning of the virtual experience, the VPEIS prompts the user to enter his/her height on the graphical user interface (GUI). The VPEIS then calculates the distance covered by a single step, for example, as a fraction of the user's height. The VPEIS allows updating the height via the GUI to accommodate multiple users using the same user device. In addition to the distance, the VPEIS determines the direction of the step. In an embodiment, the VPEIS utilizes the compass sensors of the user device to determine the direction faced by the user and then assumes that the user is walking in a forward direction. This method to determine the direction of the step is often sufficient, as the user typically walks in a forward direction the majority of the time.

In another embodiment, the virtual and physical environment integration system (VPEIS) utilizes visual cues from an image capture device, for example, a camera of the user device to determine the direction of the user's step. In this embodiment, the VPEIS determines the position and the movement of the user device within the integrated virtual environment by capturing or receiving a continuous view of the physical environment via the image capture device of the user device. That is, the VPEIS activates the image capture device of the user device, for example, during game play. During the course of a virtual experience, the image capture device of the user device is constantly capturing images, frame by frame, of the physical environment in front of the user device. In an embodiment, the VPEIS executes image recognition algorithms to process the frames captured by the image capture device of the user device to determine the direction of the user's movement. As the user moves, that is, as the user device moves, the images in each frame change, and by comparing the changes from one frame to the next, the VPEIS determines a nature of the user's movement. The VPEIS analyzes the images captured by the image capture device to determine the position, the direction, and the movement of the user device. For example, if an object in the distance begins to move closer and is visually larger in the images captured by the image capture device of the user device, the VPEIS determines that the user is moving towards the object.

In an embodiment, the virtual and physical environment integration system (VPEIS) utilizes an edge detection algorithm to perform the image comparison and transforms each frame into a collection of edges. The VPEIS then compares the edges from one frame to the next frame. In an example, if the edges tend to move away from each other toward a boundary of an image, the VPEIS determines that the user device is probably moving in a forward direction. In another example, if the edges from a first frame are closer together than the edges in a second frame, the VPEIS determines that the second frame was likely taken more closely to an object than the first frame and that the user is moving forward. If the edges in the second frame move closer together toward the center of the image, the VPEIS determines that the user device is probably moving in a backward direction. Similarly, the VPEIS compares edges across frames to identify side-to-side movement. If all the edges move in a left direction or in a right direction but maintain the same distance relative to each other, the VPEIS determines that the user device is probably moving in the right direction or the left direction. In this manner, the VPEIS uses image recognition combined with a compass heading to determine the direction of movement of the user device. The VPEIS therefore predicts the direction of the user device for each pair of frames captured by the image capture device of the user device by comparing each frame of the image. As additional frames are captured, the VPEIS makes additional predictions regarding the direction of movement of the user device, and the more consistent the predictions are across multiple frames, the higher is a confidence level of the correctness of the predictions made by the VPEIS. The VPEIS makes a series of predictions to accurately determine the direction of movement of the user device.

At this point in the computer implemented method disclosed herein, the virtual and physical environment integration system (VPEIS) on the user device knows the user's previous position, the fraction of a step taken, the direction of the step, and the distance of the step, as estimated from the user's height. With this information, the VPEIS determines the position to which the user moved. The VPEIS updates the user's position accordingly in an internal model of the virtual environment stored in the user device and then notifies virtual objects within the virtual environment as necessary.

In an embodiment, the virtual and physical environment integration system (VPEIS) also uses the global positioning system (GPS) sensors and wireless network sensors, for example, WiFi® sensors in the user device to determine the position of the user or the user device. In this embodiment, the VPEIS compares the position of the user in the internal model periodically against data from other positional sensors such as the GPS sensors and the wireless network sensors. While the GPS sensors and the wireless network sensors are not precise enough and fast enough to provide accurate visual feedback to the user, the VPEIS utilizes the GPS sensors and the wireless network sensors to make adjustments that correct for any errors in the user's position that accumulate over time. The VPEIS uses the GPS sensors and the wireless network sensors periodically to confirm the user device's internal model of the user's position and correct any errors that may have accumulated due to approximations and sensor noise. In some cases, since the user's steps may not always cover the exact same distance, while the VPEIS cannot determine the exact distance covered in each step, a single step may result in a small, unnoticeable error; however, there will be a significant shift between the physical environment and the virtual environment if the number of steps taken over the course of a single virtual experience increases. The VPEIS uses the GPS sensors and the wireless network sensors to periodically double check the position of the user. If the position is found to be substantially different during each check, the VPEIS makes subtle adjustments to correct discrepancies in the user's position. For example, in an embodiment, the VPEIS reduces or increases the distance traversed with each step and slightly alters the direction traversed in the virtual environment as compared to the direction traversed in the physical environment. The VPEIS corrects the errors in the user's position at once or gradually over time to hide their effect from the user.

In an embodiment, the virtual and physical environment integration system (VPEIS) allows the user to manually adjust the orientation of the virtual environment at any time instant within a virtual experience. That is, the VPEIS allows the user to pause the virtual experience via the graphical user interface (GUI) and update the orientation of the virtual environment at any time instant, for example, in the middle of the virtual experience. During the pause, the VPEIS does not translate the user's movement in the physical environment into a movement in the virtual environment. Therefore, the user can walk to any other location during the pause, thereby changing the position of the virtual environment relative to the physical environment. When the user resumes the virtual experience via the GUI, the VPEIS renders the virtual environment in its new position. The VPEIS coordinates the above mechanisms to translate movement in the physical environment into movement in the virtual environment. A generic computer using a generic program cannot determine the position of the user device, the movement comprising each step taken by the user of the user device, and the direction of movement of the user device in the physical environment in accordance with the method steps disclosed above.

Furthermore, for dynamically integrating the virtual environment with the physical environment on the user device, the virtual and physical environment integration system (VPEIS), in communication with one or more of the sensors of the user device, dynamically updates 103c the position of the user device, the movement comprising each step taken by the user, and the direction of movement of the user device in the oriented virtual environment. After determining the reference position of the user device, as the user moves in the physical environment, the VPEIS updates the user's position in the virtual environment. The VPEIS maintains a model of the virtual environment including the position of each virtual object within the virtual environment and the user device, for example, in the memory unit of the user device. The VPEIS controls the virtual objects and their behaviors and therefore knows their positions at all times. Since the user can move to any location at any time, the VPEIS dynamically recognizes when the user moves and to where the user moved. To accomplish this, the VPEIS requests the user to orient the virtual environment within the physical environment using the methods disclosed above. At the end of this orientation process, the VPEIS knows the orientation of the virtual environment relative to the physical environment and the reference position or the initial location of the user. From that point onward, as the user moves in the physical environment, the VPEIS updates the user's position in the virtual environment maintained by the VPEIS, for example, in the memory unit. To keep the physical environment and the virtual environment in synchronization with each other, the VPEIS recognizes when the user moves and in what direction. A generic computer using a generic program cannot dynamically update the position of the user device, the movement comprising each step taken by the user, and the direction of movement of the user device in the oriented virtual environment in accordance with the method steps disclosed above.

The virtual and physical environment integration system (VPEIS), in communication with one or more of the sensors of the user device, dynamically tracks 103d a position, a movement, and a direction of movement of each of the rendered virtual objects and the user device, interactions between the rendered virtual objects, and interactions of the rendered virtual objects with the user device in the oriented virtual environment for triggering events in the oriented virtual environment. The VPEIS tracks positional changes of the user in the physical environment more quickly and precisely than a common global positioning system (GPS) and maps the positional changes to a model of the virtual environment using a single user device. In addition to tracking the position of the virtual objects rendered in the integrated virtual environment, the VPEIS dynamically detects collisions among the virtual objects and between the virtual objects and the simulated user device when they move. For example, the VPEIS detects collisions between virtual objects, including the user, and fires events for custom handling. The VPEIS utilizes a game engine to monitor the positions of the virtual objects and perform collision detection. If the VPEIS detects a collision, the VPEIS triggers an event, for example, an alert sound, a collision sound, etc., and the developers of the virtual environment can implement handlers that determine a consequence of a collision. In an embodiment, the VPEIS tracks the distance between the virtual objects and the user to determine if there is any overlap. When the position of a virtual object overlaps the position of the user in the integrated virtual environment, the VPEIS detects a collision that results in a variety of outcomes determined by the implementation of the virtual experience. In this manner, the VPEIS creates an illusion that the virtual objects are physical and that contact with the virtual objects results in consequences. A generic computer using a generic program cannot dynamically track the position, the movement, and the direction of movement of the rendered virtual objects and the user device, the interactions between the rendered virtual objects, and the interactions of the rendered virtual objects with the user device in the oriented virtual environment, in communication with one or more of the sensors of the user device, for triggering events in the oriented virtual environment in accordance with the method steps disclosed above.

In an embodiment, the virtual and physical environment integration system (VPEIS) dynamically adjusts audio, also referred to as "sound", of the rendered virtual objects in the oriented virtual environment based on the dynamically tracked position, the movement, and the direction of movement of each of the rendered virtual objects relative to the position of the user device. The VPEIS adjusts stereo sounds emitted by the virtual objects, for example, virtual characters of a game to account for distance and position relative to the user. Throughout the course of the virtual experience, the VPEIS tracks the position of each virtual object relative to the user and the position of the user in the oriented virtual environment. The VPEIS utilizes this positional data to modify different aspects of sounds associated with the virtual objects, that is, to determine and adjust the volume of the sound emitted by those virtual objects. When a virtual object emits a sound, the VPEIS automatically adjusts the volume of the sound based on the virtual object's virtual distance from the user. As the virtual object approaches the user, the VPEIS increases the volume of the sound produced. As the virtual object retreats from the user, the VPEIS diminishes the sound until the sound can no longer be heard. In an embodiment, the VPEIS automatically adjusts a stereo sound associated with a virtual object based on the virtual object's position relative to the user's orientation. For example, in a user device that supports stereo sound, the VPEIS uses the positional data to determine the volume of a left speaker and a right speaker of the user device. When the virtual object is directly in front of the user, the VPEIS increases the volume of the sound to an equal decibel level in both the left speaker and the right speaker of the user device. The VPEIS increases the volume of the sound in the left speaker as the virtual object travels to the user's left, and reduces the volume of the sound in the right speaker, thereby creating an illusion that the sound is emanating somewhere to the left of the user. Similarly, the VPEIS increases the volume of the sound in the right speaker as the virtual object travels to the user's right, and reduces the volume of the sound in the left speaker, thereby creating an illusion that the sound is emanating somewhere to the right of the user. The VPEIS also reduces the volume of the sound if the virtual object is behind the user, to suggest the sound is coming from behind the user. The VPEIS automatically handles these audio effects and creates an auditory illusion that the virtual objects are in the surrounding physical environment. The VPEIS synchronizes the sound in the integrated virtual environment based on each virtual object's position and movement in the virtual environment to enhance an illusion of a distance and a relative position of each of the virtual objects in the integrated virtual environment.

The virtual and physical environment integration system (VPEIS) configured on the user device communicates with an operating system of the user device to adjust the audio, for example, increase the volume of the audio or decrease the volume of the audio, etc., produced by the left and right audio hardware, for example, the left speaker and the right speaker of the user device via audio drivers of the user device in communication with the sensors, for example, the location sensors, proximity sensors, etc., of the user device. The VPEIS maintains an in-memory model of the virtual environment, including the position of the user. In an embodiment, the VPEIS determines the position of each virtual object relative to the user and adjusts the volume of that virtual object's sound using an application programming interface (API) of the operating system of the user device. The developer of the virtual experience only needs to specify what sounds belong to which virtual objects and when the sounds should be emitted to allow the VPEIS to automatically handle the audio effects. A generic computer using a generic program cannot dynamically adjust the audio or sound of each of the virtual objects rendered in the oriented virtual environment based on the dynamically tracked position, the movement, and the direction of movement of each of the rendered virtual objects relative to the position of the user device in accordance with the method steps disclosed above.

In an embodiment, the virtual and physical environment integration system (VPEIS) triggers a capture of images of the virtual environment dynamically integrated with the physical environment by one or more image capture devices of the user device via the graphical user interface (GUI) and stores the captured images in the user device for analysis, modification, and distribution of the stored images. In an embodiment, the VPEIS provides a widget on the GUI that enables the user to capture an image at any time during the virtual experience provided in the integrated virtual environment. In an embodiment, the VPEIS renders an image of the physical environment captured, for example, by a rear camera of the user device as a background image displayed onscreen on the GUI. The VPEIS then overlays the virtual environment on the background image of the physical environment. The user may trigger the capture of the resulting image which is a combination of the background image of the physical environment captured by the rear camera of the user device and the overlaid virtual environment that is rendered onscreen using one or more image capture devices of the user device. The VPEIS stores the captured image, for example, in an image gallery managed by the user device. The captured image can be downloaded, shared, customized, and manipulated similar to any standard image captured by the user device. The VPEIS provides this image capture capability for any virtual experience built using the VPEIS. The VPEIS therefore allows capture of a record of the virtual experience that can be shared with other users who are not currently participating.

In an embodiment, the virtual and physical environment integration system (VPEIS) configures settings of the sensors of the user device, device elements such as speakers of the user device, and the virtual environment stored in the user device for optimizing the dynamic integration of the virtual environment with the physical environment on the user device. Sensitivity of sensors in a user device varies from one user device to another even if the user devices are obtained from the same manufacturer. To account for the sensitivity variation of sensors, the VPEIS provides multiple settings that can be adjusted by a user to tune the VPEIS for that user device. The settings comprise, for example, a step sensitivity setting, a stability setting, a calibration setting, a floor grid visibility setting, an environment visibility setting, a sound volume setting, a music volume setting, etc. The VPEIS configures the step sensitivity setting based on user inputs to alter an amount of change necessary to register a movement as a step. The VPEIS configures the stability setting based on user inputs to affect how quickly the virtual environment responds to a movement of the user device. The VPEIS configures the calibration setting based on user inputs to cause the VPEIS to listen to sensor output over a predefined interval of time to optimally separate a true signal from noise for each sensor. The VPEIS also changes the way the virtual experience appears and sounds through other settings, for example, the floor grid visibility setting, the environment visibility setting, the sound volume setting, the music volume setting, etc., based on user inputs. The VPEIS configures the floor grid visibility setting based on user inputs to determine whether the floor of the virtual environment appears as a grid. The VPEIS configures the environment visibility setting based on user inputs to enable the user to make the virtual environment partially transparent so that the physical environment can be viewed behind the virtual objects in the virtual environment. The VPEIS configures the sound volume setting based on user inputs to control the volume of environment sounds. The VPEIS configures the music volume setting based on user inputs to control the volume of background music The data inputted by the user, for example, the dimensions of the physical environment, the reference position of the user device in the physical environment, the user's height, the user inputs for configuring the settings of the sensors, the device elements of the user device, the virtual environment, etc., via the graphical user interface (GUI) is transformed, processed and executed by an algorithm in the virtual and physical environment integration system (VPEIS) for dynamically integrating the virtual environment with the physical environment on the user device.

In an embodiment, the virtual and physical environment integration system (VPEIS) communicates with one or more auxiliary user devices of other users via a network to allow participation of the auxiliary user devices in the dynamically integrated virtual environment. The VPEIS allows multiple users to participate in the same virtual experience simultaneously by enabling their user devices to communicate over the network. The VPEIS broadcasts user actions in the virtual experience to other users on the same network, thereby enabling multiple users to participate in the same virtual experience simultaneously. The VPEIS allows the communication with multiple auxiliary user devices through multiple different communication mechanisms comprising, for example, radio, wireless networks, the internet, near field communication, etc. In this embodiment, each user device maintains a representation of the same virtual environment. The VPEIS coordinates the state of multiple auxiliary user devices across the network to facilitate multi-device user interactions. When the state of a user device changes, for example, if the user device changes its position or if one of the users performs an action, the user device broadcasts its state to the other auxiliary user devices and/or, in an embodiment, to a central server. The auxiliary user devices then update their representations of the virtual environment accordingly. In this manner, the VPEIS on each of the user devices updates each other and remains in synchronization to render a common view of the same virtual environment to multiple users across multiple user devices. In an embodiment, the auxiliary user devices are distinguished visually from virtual objects that are not representative of user devices. In an embodiment, a single user may operate multiple user devices that are coordinated within the virtual experience through a network communication.

In an embodiment, the virtual and physical environment integration system (VPEIS) renders the virtual environment in one or more views at one or more of multiple angles on the user device via the graphical user interface (GUI). A user typically experiences the virtual environment from the perspective of a participant in that virtual environment. The VPEIS provides, for example, a "bird's eye view" mode to the user to allow the user to view the virtual environment as though the user is looking through a camera that can be moved to any position within the virtual environment. The VPEIS generates a view such that the camera is initially positioned directly above the virtual environment, looking down upon the virtual environment, to allow the user to view the entire virtual environment from above. The VPEIS generates views of the virtual environment from any angle by effecting a change in the position of the camera. The VPEIS generates views by movement of the camera based on user inputs. For example, the VPEIS tilts the virtual environment up or down when the user drags a finger up or down onscreen via the GUI; spins the virtual environment in a clockwise direction or a counterclockwise direction about a central axis perpendicular to a floor of the virtual environment when the user drags a finger in a left direction or a right direction onscreen via the GUI; zooms in or out of the virtual environment, for example, when the user uses a pinch gesture on the GUI; shifts the virtual environment to the left or right when the user drags two fingers onscreen via the GUI, etc. The VPEIS therefore allows the user to view the virtual environment from a third party perspective, one in which the user is only an observer and not participating in the virtual experience.

In an embodiment of the computer implemented method disclosed herein, the configuration and flow of interactions between the virtual and physical environment integration system (VPEIS), the sensors of the user device, and other hardware of the user device is deliberate, designed, and directed for dynamically integrating a virtual environment with a physical environment on the user device. Every prompt, every instructional direction, etc., the user receives from the VPEIS via the graphical user interface (GUI) is configured by the VPEIS to steer the user towards a finite set of predictable outcomes. The VPEIS executes one or more specific computer programs to direct the user towards a set of end results. The interactions with the user device configured by the VPEIS allows the VPEIS to collect sensor data, and from this sensor data, through the use of another, separate and autonomous computer program, to determine and track a user's position, movement and direction of movement. This determination is used as a trigger to dynamically integrate the virtual environment with the physical environment. To receive and process dimensions of the physical environment, the reference position of the user device in the physical environment, and the orientation of the physical environment, to orient the virtual environment relative to orientation of the physical environment and the reference position of the user device in the physical environment, to determine a position, a movement, and a direction of movement of the user device in the physical environment in communication with one or more of the sensors, to dynamically update the position, movement, and direction of movement of the user device in the oriented virtual environment in communication with one or more of the sensors, to track a position, a movement, and a direction of movement of each of the rendered virtual objects and the user device, the interactions between the rendered virtual objects, and the interactions of the rendered virtual objects with the user device in the oriented virtual environment, and to dynamically adjust the audio of the rendered virtual objects in the oriented virtual environment based on the tracking requires no less than seven separate computer programs, and cannot be easily or manually executed by a person working with a generic computer. A generic computer using a generic program cannot dynamically integrate the virtual environment with the physical environment on the user device in accordance with the method steps 103*a*, 103*b*, 103*c*, and 103*d* exemplarily illustrated in FIG. 1 and disclosed above.

The computer implemented method and the virtual and physical environment integration system (VPEIS) disclosed herein are used for creating virtual experiences on user devices, for example, those devices involving a spatial model that maps to a physical environment. As the VPEIS can be configured as mobile applications that work on user devices already owned and carried by millions of users, the virtual experiences can be designed for almost anywhere users go. The VPEIS that executes the method steps of the computer implemented method disclosed herein has multiple applications, for example, in games, instructional tools, event promotions, education, advertising, film, navigation, etc. In gaming, the VPEIS allows users to play a video game on the user device from the perspective of being inside the virtual environment. Furthermore, the VPEIS can be used as an instructional tool to enhance standard directions and videos. For example, a furniture company can provide the VPEIS configured as a mobile application to its customers, using which a person assembling furniture can bring up a life-size model of a furniture piece on the graphical user interface (GUI) provided by the VPEIS on the user device and compare the furniture piece side-by-side with another furniture piece in a physical environment at every step of the instructions. Event promoters can release the VPEIS configured, for example, as a mobile application to allow their audience to view a virtual event that enhances a real event. For example, the VPEIS allows users at a football game can watch a virtual half-time event on a physical football field by integrating the virtual half-time event with the physical football field on each of their user devices. The VPEIS renders the virtual half-time event simultaneously to all users via the graphical user interface of each of their user devices, as though the half-time event were actually occurring on the physical football field. In an embodiment, the VPEIS renders an interactive virtual half-time event, for example, a virtual tug of war in which home team fans compete against visiting fans by interacting with their user devices.

In another application, educators can use the virtual and physical environment integration system (VPEIS) to create virtual experiences to engage students in memorable ways, for example, from participating in a virtual rendition of a famous literary scene to visualizing aspects of the physical environment that could never truly be witnessed. In another application, advertisers can use the VPEIS to create compelling virtual experiences that generate buzz for their products and to tailor the virtual experiences to match users' profiles. In another application, advertisers use the VPEIS to deliver advertisements or information in an integrated virtual environment display. In another application, filmmakers can use the VPEIS to immerse viewers in their stories and design virtual experiences around real world locations. For example, audiences can travel to a real world bridge, look out into an actual ocean, and view a giant monster in a movie rising from the ocean by using the VPEIS. In another example, the VPEIS directs a user to capture a view of a physical location such as the Golden Gate Bridge to view a three-dimensional trailer for a movie. When the user device captures a view of the bridge with an image capture device such as the camera of the user device, the VPEIS integrates a virtual character such as a monster standing on the bridge. As the user moves around the bridge and the camera image changes, the virtual depiction of the monster changes correspondingly such that the user can experience the integrated virtual environment advertisement in three dimensions. In another application, the VPEIS can be used to guide users through physical locations, for example, museums, malls, airports, etc., while providing specific directions, for example, in the form of virtual arrows visible through their user devices, that update as the user's position changes within the physical locations.

Consider an example where the virtual and physical environment integration system (VPEIS) dynamically integrates a virtual environment in the form of a virtual game with a physical environment on a user device. The user initializes the VPEIS via the graphical user interface (GUI) on the user device. The VPEIS prompts the user to define dimensions of the physical environment for the virtual game or select predefined dimensions, for example, 94 feet by 50 feet for a basketball court, 30 feet by 30 feet for a yard, etc., via the GUI. The user selects the predefined dimensions, for example, 94 feet by 50 feet for the physical environment in the virtual game to be generated. The VPEIS then displays reference positions at multiple locations on a graphical representation of the physical environment on the GUI and prompts the user to select a reference position nearest to the user. The user selects the reference position via the GUI. The VPEIS defines the selected reference position as a reference point common to both the virtual environment and the physical environment. The VPEIS then prompts the user to move to the selected reference position. The user carries the user device and moves to the selected reference position. The VPEIS displays a virtual game boundary having the same dimensions as the predefined dimensions selected by the user for the physical environment on the GUI and prompts the user to align an edge of the virtual game boundary displayed on the GUI with an edge of the physical environment boundary. When the user aligns the edges of the virtual game boundary and the physical environment boundary, the VPEIS integrates the orientation of the virtual game relative to the orientation of the physical environment on the GUI and renders virtual game objects in the integrated virtual game on the GUI. The user can then interact with the virtual game objects in the integrated virtual game via the GUI. If the user moves in the physical environment, the VPEIS determines and updates the position, the movement, and the direction of movement of the user in the integrated virtual game. As the user moves closer to the virtual game objects in the integrated virtual game, the VPEIS adjusts the audio of the virtual game objects with respect to the position of the user. For example, if a virtual game object is proximal to the left of the user, then the VPEIS adjusts the audio of the virtual game object such that the audio is more prominent towards the left of the user than in any other direction, hence creating an illusion of a physical environment scenario for the user via the user device. When the user moves towards and collides with the virtual game objects, the VPEIS alerts the user with a collision sound. The VPEIS also monitors the interactions between the virtual game objects and produces collision sounds when there are collisions between the virtual game objects. The user therefore experiences the virtual game that mimics a physical environment with interactions between the virtual game objects, audio, collision detection, etc., on the user device.

Consider another example where the virtual and physical environment integration system (VPEIS) dynamically integrates virtual furniture in a physical living room on a user device. A user can download the VPEIS configured as a mobile application on the user device and initiate the VPEIS via the graphical user interface (GUI) provided by the VPEIS on the user device. The VPEIS prompts the user via the GUI to enter dimensions of the living room for the living room or select predefined dimensions for the living room. The user enters dimensions for the living room, for example, as 14 feet by 14 feet on the GUI. The VPEIS prompts the user via the GUI of the user device to enter dimensions for virtual furniture objects to be integrated into the physical environment of the living room. The user enters, for example, a length of a virtual furniture object as 1000 millimeters, a width of the virtual furniture object as 1500 millimeters, and a height of the virtual furniture object as 1900 millimeters, etc., via the GUI. Similarly, the user defines the dimensions of other virtual furniture objects to be integrated into the physical environment of the living room via the GUI. The VPEIS receives and processes the dimensions of the living room and the virtual furniture objects via the GUI, displays reference positions at multiple locations in the living room on the GUI, and prompts the user to select a reference position nearest to the user. The user selects a reference position via the GUI. The VPEIS then prompts the user to move to the user selected reference position in the living room. The user carries the user device and moves to the selected reference position in the living room. The VPEIS renders a camera display of the living room on the GUI and overlays the virtual furniture objects on top of the camera display of the living room on the GUI. The VPEIS prompts the user to align the virtual furniture objects displayed on the GUI with the living room, for example, by angling the user device or moving the user device, and when the user moves the user device, the VPEIS renders changes in the living room on the camera display on the GUI, while retaining the virtual furniture objects in a fixed position on the GUI to allow the user to visually experience how real furniture would appear in the living room. The user can utilize the bird's eye view mode of the VPEIS to view the virtual furniture objects in the living room from different angles via the GUI. The user can select multiple virtual furniture objects to be integrated onto the living room via the GUI. The user can also change the position of the integrated virtual furniture objects via the GUI.

Consider another example where the virtual and physical environment integration system (VPEIS) dynamically integrates a virtual environment in the form of a virtual tennis game with a physical environment on a user device. The physical environment can be of any size, so the user can initially specify the dimensions for the physical environment to be integrated with the virtual environment for creation of the virtual tennis game. The user initiates the VPEIS via the graphical user interface (GUI) of the user device. The VPEIS prompts the user to enter dimensions of a physical tennis court or select predetermined dimensions, for example, 14 feet×14 feet for the physical tennis court. The VPEIS reinforces the idea that the virtual experience should be run in a safe and open physical space. The VPEIS then displays reference positions at multiple locations on a graphical representation of physical tennis court on the GUI and prompts the user to select a reference position nearest to the user. The user selects the reference position via the GUI. The VPEIS then prompts the user to move to the selected reference position. The user carries the user device and moves to the selected reference position. The VPEIS renders a camera display of the physical tennis court on the GUI and overlays the virtual tennis game on top of the camera display of the physical tennis court on the GUI. The VPEIS displays a virtual tennis court boundary having the same dimensions as the dimensions entered or selected by the user for the physical tennis court on the GUI and prompts the user to align an edge of the virtual tennis court boundary displayed on the GUI with an edge of the physical tennis court boundary. When the user aligns the edges of the virtual tennis court boundary and the physical tennis court boundary, the VPEIS integrates the orientation of the virtual tennis court relative to the orientation of the physical tennis court on the GUI and renders virtual tennis game objects, for example, a virtual tennis ball, a virtual net, etc., in the integrated virtual tennis game on the GUI. The user can then interact with the virtual tennis game objects, for example, the virtual tennis ball, etc., via the GUI. If the user moves in the physical tennis court, the VPEIS determines and updates the position, the movement, and the direction of movement of the user in the integrated virtual tennis game. As the user moves closer to the virtual tennis ball in the integrated virtual tennis game, the VPEIS adjusts the audio of the virtual tennis ball with respect to the position of the user. For example, if the user hits the virtual tennis ball from the left of the user, then the VPEIS adjusts the audio of the virtual tennis ball such that the audio is more prominent towards the left of the user than in any other direction, thereby creating an illusion of a tennis game to the user via the user device. When the user moves towards the virtual tennis ball and hits the virtual tennis ball, the VPEIS alerts the user with a contact sound. The VPEIS also monitors the interactions between the virtual tennis game objects, for example, interactions between the tennis ball and the virtual net, etc., and produces a contact sound when there is a collision between the virtual tennis ball and the virtual net.

Consider another example where the virtual and physical environment integration system (VPEIS) is used to create a movie trailer that can be experienced in a specific physical location, for example, a bridge such as the Golden Gate Bridge. A user launches the VPEIS configured as a mobile application on a user device, for example, a tablet while standing on the bridge. Because the virtual environment is tailored to a specific physical location, the VPEIS knows the size of the physical location and hence the user does not need to enter the dimensions of the physical location. The VPEIS then renders an image of the bridge on the graphical user interface (GUI) to allow the user to touch the image and specify his/her position on the bridge. In an embodiment, if global positioning system (GPS) sensors are available on the user device, the VPEIS utilizes the GPS sensors to determine the user's position on the bridge. Furthermore, since the bridge is a known, specific physical location, the user does not need to align the virtual environment with the physical environment. Instead, the VPEIS determines the orientation of the physical environment by utilizing the compass sensor of the user device. After these steps, the VPEIS knows the size of the virtual environment to be created, the user's position in the physical environment, and the orientation of the virtual environment within the physical environment. The VPEIS can therefore begin the movie trailer by rendering a virtual object, for example, a virtual creature such as a giant monster of a movie in the oriented virtual environment on the user device via the GUI.

When the user looks out toward the Pacific Ocean, the user can view the giant monster rising out of the water and walking towards the bridge. As the giant monster approaches the bridge, the virtual and physical environment integration system (VPEIS) increases the audio generated by the giant monster. If the user starts to walk toward the other side of the bridge, data from the accelerometers of the user device match an oscillating wave pattern, and therefore the VPEIS recognizes the user's steps and updates the user's position in the internal model of the virtual environment. At any time, the VPEIS allows the user to capture an image of the giant monster that shows the virtual creature with the real Pacific Ocean behind the virtual creature on the user device. Regardless of how the user turns, the roars of the giant monster appear to come from the Pacific Ocean to the west because the VPEIS adjusts the volume of stereo headphones of the user device to create an illusion that the sound emanates from a particular direction. When the giant monster finally reaches the bridge, the user would need to look almost straight upward to see the giant monster towering above. With a swipe of its massive claw, the giant monster may strike the user, which triggers a vibration on the user device causing the user device to vibrate and end the movie trailer. The VPEIS may then show a screen on the GUI from which the user can buy tickets to the upcoming movie.

In an example implementation, the virtual and physical environment integration system (VPEIS) is configured as a virtual navigation assistant. In this example implementation, the VPEIS is configured to guide users through physical locations, for example, museums, malls, airports, etc., while providing specific directions such as virtual direction markers visible through their user devices, that dynamically update as the users' positions change within the physical location. A user downloads the VPEIS configured, for example, as a mobile application on the user device and invokes the VPEIS via the graphical user interface (GUI) provided by the VPEIS on the user device. The VPEIS prompts the user to select a predefined destination, for example, a museum, a hotel, etc. The user selects the destination via the GUI. The VPEIS renders a camera display of the selected destination on the GUI and overlays virtual direction markers, for example, virtual arrows on top of the camera display of the selected destination on the GUI. The integrated virtual direction markers displayed on the GUI guide the user to navigate to the selected destination. The VPEIS further guides the user, for example, through an audio output that instructs the user to walk left, walk right, walk straight, etc., to navigate to the selected destination.

Figure 2:
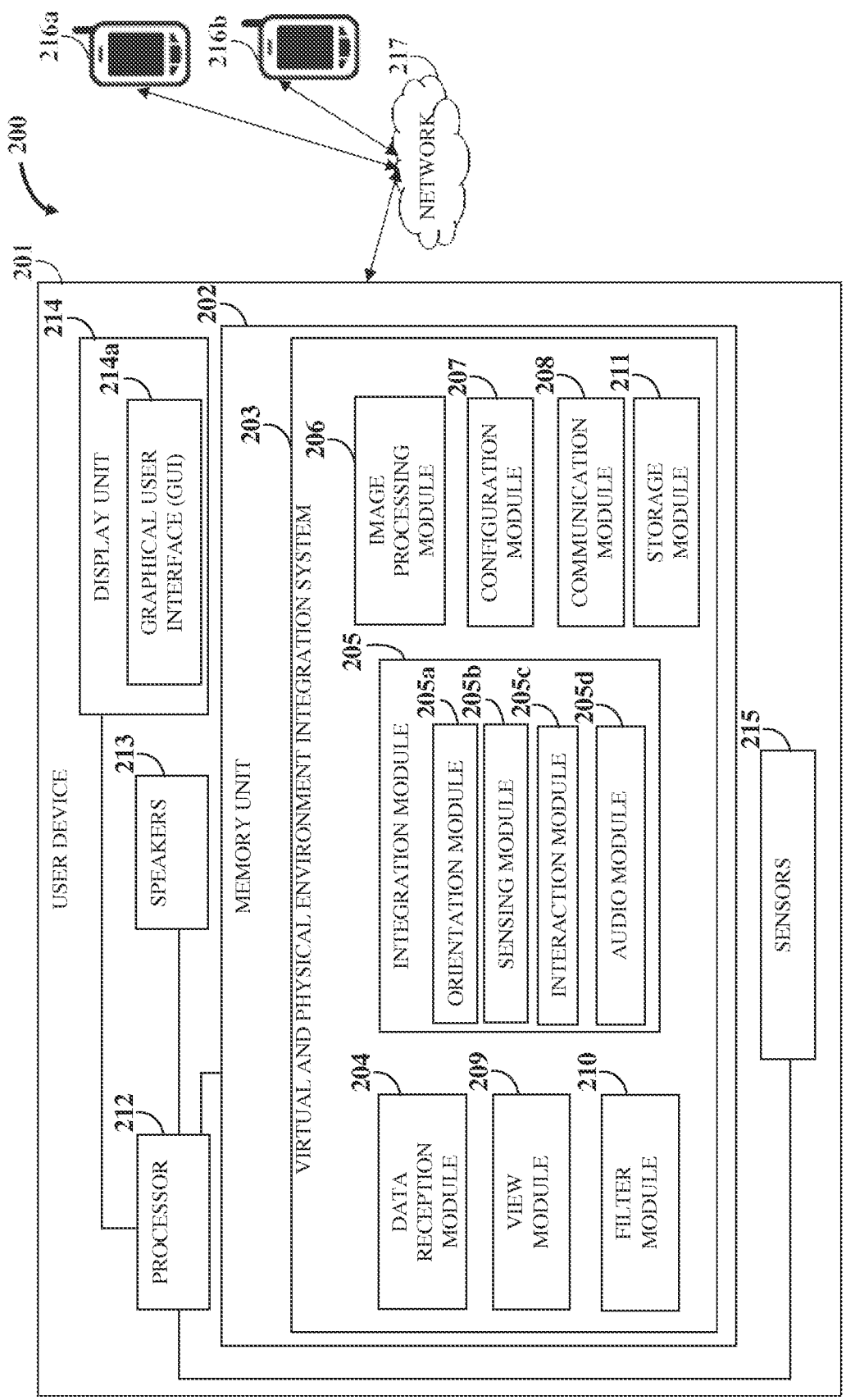
FIG. 2 exemplarily illustrates a computer implemented system comprising a virtual and physical environment integration system implemented on a user device for dynamically integrating a virtual environment with a physical environment on the user device.

FIG. 2 exemplarily illustrates a computer implemented system 200 comprising the virtual and physical environment integration system (VPEIS) 203 implemented on a user device 201 for dynamically integrating a virtual environment with a physical environment on the user device 201. The user device 201 is an electronic device, for example, a tablet computing device, a mobile computer, a mobile phone, a smart phone, a portable computing device, a personal digital assistant, a laptop, a wearable computing device such as the Google Glass™ of Google Inc., the Apple Watch® of Apple Inc., etc., a touch centric device, a client device, a portable electronic device, a network enabled computing device, an interactive network enabled communication device, a gaming device, an image capture device, any other suitable computing equipment, combinations of multiple pieces of computing equipment, etc. In an embodiment, the user device 201 is a hybrid computing device that combines the functionality of multiple devices. Examples of a hybrid computing device comprise a cellular telephone that includes a media player functionality, a gaming device that includes a wireless communications capability, a cellular telephone that includes gaming and multimedia functions, and a portable device that receives electronic mail (email), supports mobile telephone calls, has a music player functionality, and supports web browsing. In an embodiment, the computing equipment is used to implement applications such as media playback applications, a web browser, a mapping application, etc.

As exemplarily illustrated in FIG. 2, the user device 201 comprises a non-transitory computer readable storage medium, for example, a memory unit 202 and at least one processor 212 communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 212, except for a transitory, propagating signal. The non-transitory computer readable storage medium is configured to store computer program instructions defined by modules, for example, 204, 205, 205a, 205b, 205c, 205d, 206, 207, 208, 209, 210, 211, etc., of the virtual and physical environment integration system (VPEIS) 203. In an embodiment as exemplarily illustrated in FIG. 2, the VPEIS 203 is installed and stored in the memory unit 202 of the user device 201. The processor 212 is configured to execute the computer program instructions defined by the modules, for example, 204, 205, 205a, 205b, 205c, 205d, 206, 207, 208, 209, 210, 211, etc., of the VPEIS 203.

The user device 201 further comprises speakers 213, a display unit 214, and sensors 215. The virtual and physical environment integration system (VPEIS) 203 communicates with the speakers 213 of the user device 201 to dynamically adjust the volume of virtual objects rendered in the virtual environment dynamically integrated with the physical environment on the user device 201, herein referred to as the "integrated virtual environment". The VPEIS 203 renders a graphical user interface (GUI) 214a on the display unit 214 to receive user inputs, user selections, etc., and to allow the user to view the integrated virtual environment. The GUI 214a is, for example, a web based downloadable application interface, a mobile based downloadable application interface, etc. The sensors 215 internal to the user device 201 comprise, for example, accelerometers, compass sensors, a gyroscope, global positioning system sensors, wireless network sensors, location sensors, an altimeter, one or more image capture devices, etc. In an embodiment, the VPEIS 203 is accessible to users, for example, through a broad spectrum of technologies and devices such as cellular phones, tablet computing devices, etc., with access to a network 217, for example, the internet.

The virtual and physical environment integration system (VPEIS) 203 is activated on the display unit 214 of the user device 201 via the graphical user interface (GUI) 214a. The VPEIS 203 comprises a data reception module 204, a three-dimensional integration module 205, an image processing module 206, a configuration module 207, a communication module 208, a view module 209, and a storage module 211. The data reception module 204 receives and processes dimensions of the physical environment from the user device 201. The data reception module 204 further receives and processes a reference position of the user device 201 in the physical environment and an orientation of the physical environment from the user device 201. In an embodiment, the VPEIS 203 further comprises a data encryption module (not shown) to encrypt input data. The integration module 205, in communication with the data reception module 204, dynamically integrates the virtual environment retrieved from the memory unit 202 of the user device 201 with the physical environment on the user device 201 by processing and transforming the received and processed dimensions of the physical environment, the received and processed reference position of the user device 201 in the physical environment, the received and processed orientation of the physical environment, and the retrieved virtual environment.

The processor 212 executes the integration module 205 of the virtual and physical environment integration system (VPEIS) 203 to generate the integrated virtual environment. The integration module 205 comprises an orientation module 205a, a sensing module 205b, an interaction module 205c, and an audio module 205d. The orientation module 205a orients the retrieved virtual environment relative to the received and processed orientation of the physical environment and the received and processed reference position of the user device 201 in the physical environment to fit the retrieved virtual environment within the physical environment and render virtual objects of the retrieved virtual environment within the physical environment. In an embodiment, the orientation module 205a performs the orientation of the retrieved virtual environment relative to the received and processed orientation of the physical environment and the received and processed reference position of the user device 201 in the physical environment by rendering images of the physical environment captured by one or more image capture devices of the user device 201 on the graphical user interface (GUI) 214a, overlaying a boundary of the retrieved virtual environment on the rendered images of the physical environment, and aligning the overlaid boundary of the retrieved virtual environment with a boundary of the physical environment during rotations of the user device 201 to determine a compass bearing at which the overlaid boundary of the retrieved virtual environment and the boundary of the physical environment align.

In an embodiment, the orientation module 205a utilizes a rotation matrix that defines a rotation of the user device 201, created using motion data from one or more of the sensors 215 of the user device 201 for the orientation of the retrieved virtual environment relative to the received and processed orientation of the physical environment and the received and processed reference position of the user device 201 in the physical environment. In an embodiment, the orientation module 205a implements a methodology for orienting the virtual environment based on geolocation and correspondence with the physical environment. The orientation module 205a also implements a methodology for sizing and orienting the virtual environment within the physical environment. The orientation module 205a also updates the orientation of the retrieved virtual environment relative to the received and processed orientation of the physical environment on the user device 201 based on an update to the reference position of the user device 201 at any time instant.

The sensing module 205b, in communication with one or more of the sensors 215 of the user device 201, determines a position of the user device 201, a movement comprising each step taken by a user of the user device 201, and a direction of movement of the user device 201 in the physical environment. The sensing module 205b, in communication with one or more of the sensors 215 of the user device 201, dynamically updates the position, the movement comprising each step taken by the user, and the direction of movement of the user device 201 in the oriented virtual environment. In an embodiment, the data reception module 204 receives and processes a height of the user. In this embodiment, the sensing module 205b, in communication with the data reception module 204, determines the distance covered in a single step by the user in the physical environment using the received and processed height of the user for the determination of the position of the user device 201, the movement comprising each step taken by the user of the user device 201, and the direction of movement of the user device 201 in the physical environment. The sensing module 205b dynamically tracks the position, the movement, and the direction of movement of the user device 201 in the physical environment using a combination of the received and processed height of the user, each step taken by the user and tracked by the virtual and physical environment integration system (VPEIS) 203 in communication with one or more of the sensors 215 of the user device 201, and the direction of movement of the user device 201 determined in communication with one or more of the sensors 215 of the user device 201, and dynamically updates the dynamically tracked position, the movement, and the direction of movement of the user device 201 in the oriented virtual environment.

The sensing module 205b coordinates the sensors 215 of the user device 201 to map physical environment changes in orientation to virtual environment orientation changes. The sensing module 205b also coordinates with the sensors 215 of the user device 201 to recognize changes in the position of the user device 201 in the integrated virtual environment. In an embodiment, the virtual and physical environment integration system (VPEIS) 203 further comprises a filter module 210 for filtering noise from data received from the sensors 215 of the user device 201. The orientation module 205a initially orients the virtual environment within the physical environment. At the end of this process, the orientation module 205a knows the orientation of the virtual environment relative to the physical environment and the initial reference position of the user device 201. As the user moves in the physical environment, the sensing module 205b updates the user's position in the oriented virtual environment. The sensing module 205b configures the user device 201 to recognize when the user moves and in what direction and to keep the physical environment and the virtual environment in synchronization. The storage module 211 of the VPEIS 203 maintains a model of the virtual environment that has the positions and behaviors of each virtual object within the virtual environment, including the user device 201 in the memory unit 202, similar to three-dimensional type video games.

In an embodiment, the sensing module 205b determines the position of the user device 201 by utilizing one or more of the sensors 215, for example, the global positioning system (GPS) sensors and the wireless network sensors of the user device 201. For improved determination of the position of the user device 201, the sensing module 205b uses input from the sensors 215, for example, the accelerometers, the compass sensors, the GPS sensors, the image capture devices such as cameras, etc., of the user device 201. For example, the sensing module 205b uses the accelerometers of the user device 201 to recognize when the user takes a step and receives information about the orientation of the user device 201 from measurements of acceleration of the user device 201 in three dimensions from the accelerometers. The sensing module 205b utilizes the measured acceleration in three dimensions to determine when the user device 201 is moving in the same or opposite direction of gravity. For example, to determine the distance covered in a single step, the sensing module 205b employs a heuristic technique based on the height of the user. At the beginning of the virtual experience, the data reception module 204 prompts the user to enter the user's height via the graphical user interface (GUI) 214a. The sensing module 205b calculates the distance covered by a single step as a fraction of the user's height. The sensing module 205b allows the height to be changed to allow use of the same user device 201 among multiple users.

The interaction module 205c, in communication with one or more of the sensors 215 of the user device 201, dynamically tracks a position, a movement, and a direction of movement of each of the virtual objects rendered in the integrated virtual environment on the graphical user interface (GUI) 214a and of the user device 201, interactions between the rendered virtual objects, and interactions of the rendered virtual objects with the user device 201 in the oriented virtual environment for triggering events in the oriented virtual environment. In addition to tracking the positions of the rendered virtual objects and the user device 201, the interaction module 205c monitors for collisions among the rendered virtual objects and the user device 201 when these rendered virtual objects traverse throughout the integrated virtual environment. The interaction module 205c monitors the positions of the rendered virtual objects and performs collision detection. The interaction module 205c detects collisions between the rendered virtual objects, including the user device 201, triggers an event, for example, a collision sound, an alert sound, etc., and manages events for custom handling. For example, if a tree is present in the integrated virtual environment, the interaction module 205c provides feedback to the user if the user contacts the tree, as the user is walking around the physical environment that has no trees. That is, the tree is only present in the virtual part of the integrated virtual environment. The interaction module 205c triggers a vibration in the user device 201 or configures the user device 201 to output a sound that is indicative of collisions.

The audio module 205d dynamically adjusts audio of the rendered virtual objects in the oriented virtual environment based on the dynamically tracked position, the movement, and the direction of movement of each of the rendered virtual objects relative to the position of the user device 201. The audio module 205d adjusts the audio, for example, sounds, stereo output, etc., emitted by the rendered virtual objects to account for distance and positions of the rendered virtual objects relative to the user device 201 in the integrated virtual environment. For example, when a user approaches a virtual object that is making a sound in the integrated virtual environment, the audio module 205d adjusts the volume of the sound that is output by the user device 201 and that the user hears, in proportion to the position of the user device 201 relative to the virtual object. The audio module 205d outputs a sound at a lower decibel level when the user device 201 is moving away from the virtual object than when the user is approaching the virtual object. The audio module 205d adjusts the sound in a left direction and a right direction as necessary when the user device 201 traverses through the integrated virtual environment. The audio module 205d communicates with the speakers 213 of the user device 201 to adjust the audio of the rendered virtual objects in the integrated virtual environment.

The image processing module 206 of the virtual and physical environment integration system (VPEIS) 203 triggers a capture of images of the virtual environment dynamically integrated with the physical environment by one or more of the sensors 215, for example, the image capture devices of the user device 201, via the graphical user interface (GUI) 214a. The storage module 211 stores the captured images, for example, in an image gallery in the memory unit 202 of the user device 201 for analysis, modification, and distribution of the stored images. The image processing module 206 enables the user to capture an image of the integrated virtual environment that combines the physical environment and the virtual environment via an image capture device, for example, a camera of the user device 201.

The configuration module 207 of the virtual and physical environment integration system (VPEIS) 203 configures settings of the sensors 215 of the user device 201, device elements of the user device 201, and the virtual environment stored in the user device 201 for optimizing the dynamic integration of the virtual environment with the physical environment on the user device 201. Since the virtual experience generated by the VPEIS 203 can be implemented on a wide variety of user devices and each type of user device 201 has a different array of sensors 215 and capabilities, the configuration module 207 of the VPEIS 203 provides configurable settings to enable the user to customize aspects of the virtual environment for their particular user device 201. The configurable settings enable a user to adjust aspects of the virtual experience to perform optimally on the user device 201. In an example, a user can configure settings to adjust sensitivity of different sensors 215, for example, accelerometers, compass sensors, etc., of the user device 201 via the configuration module 207 of the VPEIS 203 in the user device 201. The configuration module 207 ensures that the integrated virtual environment is displayed on the graphical user interface (GUI) 214a optimally to the user.

The communication module 208 of the virtual and physical environment integration system (VPEIS) 203 communicates with one or more auxiliary user devices 216a and 216b via a network 217 to allow participation of one or more auxiliary user devices 216a and 216b in the dynamically integrated virtual environment. The network 217 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of Zig- Bee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

The view module 209 of the virtual and physical environment integration system (VPEIS) 203 renders the retrieved virtual environment in one or more views at one or more of multiple angles on the user device 201 via the graphical user interface (GUI) 214a. The view module 209 renders a bird's eye view or another perspective view of the retrieved virtual environment or the integrated virtual environment on the GUI 214a that enables the user to tilt, rotate, and zoom through the retrieved virtual environment or the integrated virtual environment to watch virtual environment activity from any angle. The view module 209 also provides a stationary mode that allows the user to move within the integrated virtual environment without moving in the physical environment by using an interface element, for example, a virtual joystick rendered on the GUI 214a or, in an embodiment, using input devices, for example, a joystick, keyboard, computer mouse, etc.

The virtual and physical environment integration system (VPEIS) 203 builds upon public application programming interfaces (APIs) offered by the operating system of the user device 201. The graphical user interface (GUI) 214a is implemented using operating system libraries, and the virtual environment is rendered using an open graphics library (OpenGL) implementation supplied by the operating system. An example pseudocode that defines the VPEIS 203 and specifically programs the processor 212 of the user device 201 to dynamically integrate a virtual environment with a physical environment on the user device 201 and create an integrated virtual environment on the user device 201 is provided below:

```
/**
 *  The following pseudocode shows the basic logic flow and data
 *  used by the VPEIS to manage a virtual environment within a physical
 environment.
 */
public class VPEISController {
    /**
     *  The following parameters are set when
     *  the user interacts with the GUI to set up the virtual environment.
     */
    // Set after the user specifies his/her height
    public void setUserHeight(float
    userHeight);
    // Set after the user selects the size of the virtual environment
    public void setWorldDimensions(float worldWidth, float worldHeight);
    // Set after the user specifies his/her location in the virtual environment
    public void setInitialPosition(Vector initPosition); public void
    setInitialOrientation(Vector initOrientation);
    // Set after the user aligns the boundary of the virtual environment
    // with the boundary in the physical environment. public void
    setWorldBearing(float worldBearing);
    // Set when the user runs a routine that
    // calibrates sensors.
    public setCalibrationData(calibrationData);
    /**
    The routine to initialize the virtual environment.
    It is called once when the virtual experience starts.
    */
    public initWorld( ) {
        // Create the virtual environment and place a representation
        // of the user inside it.
        World world = buildWorld(worldWidth, worldHeight);
        world.positionUser(initialPosition);
        world.rotateUser(initOrientation, worldBearing);
    }
    /**
    This routine is called every time the virtual environment
    is redrawn by a game engine utilizing the VPEIS.
    */
    public updateWorld( ) {
        // Obtain the latest data from the sensors of the user device
        // and filter the data to reduce noise. SensorData sensorData =
        getRawSensorData( ); filterSensorData(sensorData, calibrationData);
        // Determine the user's orientation in the physical environment
        // and adjust the user's orientation in the virtual environment to
        match. Matrix rotation = determineRotation(sensorData);
        world.rotateUser(rotation, worldBearing);
        // Determine if the user's position changed in the physical
        environment
```

```
    // and move the user in the virtual environment to match. float step =
    determineStepFraction(sensorData);
    if (step > 0) {
        Vector direction =
        determineDirection(sensorData); float distance
        = determineDistance(step, userHeight);
        world.moveUser(direction * distance);
        // The user's movement might have resulted in a collision
        // with a virtual object. Check for that
        // and handle it if necessary.
        if
        (world.collisionOccurred( ))
        { handleCollision( );
        }
    }
    // Iterate over every virtual object in the experience. Object[ ] objects =
    world.getVirtualObjects( );
    for each object in objects {
        // Update the object's position based on its behavioral logic.
        Vector movement = object.determineMovement( );
        world.moveObject(movement);
        if (world.collisionOccurred( )) {
            handleCollision( );
        }
        // Adjust the volume of any sounds it emits based
        // on its position relative to the user.
        Sound[ ] sounds = object.getSounds( );
        if (sounds, length > 0) {
            Vector fromUserToObject =
            determineRelativePosition(world.getUser( ).getPosition(
            ),
                object.getPosition( ));
            float leftVol, rightVol;
            determineVolume(fromUserToObject, leftVol,
            rightVol);
            for each sound in sounds {
            operatingSystem.playSound(sound, leftVol, rightVol);
            }
        }
    }
    }
}
```

Figure 3:
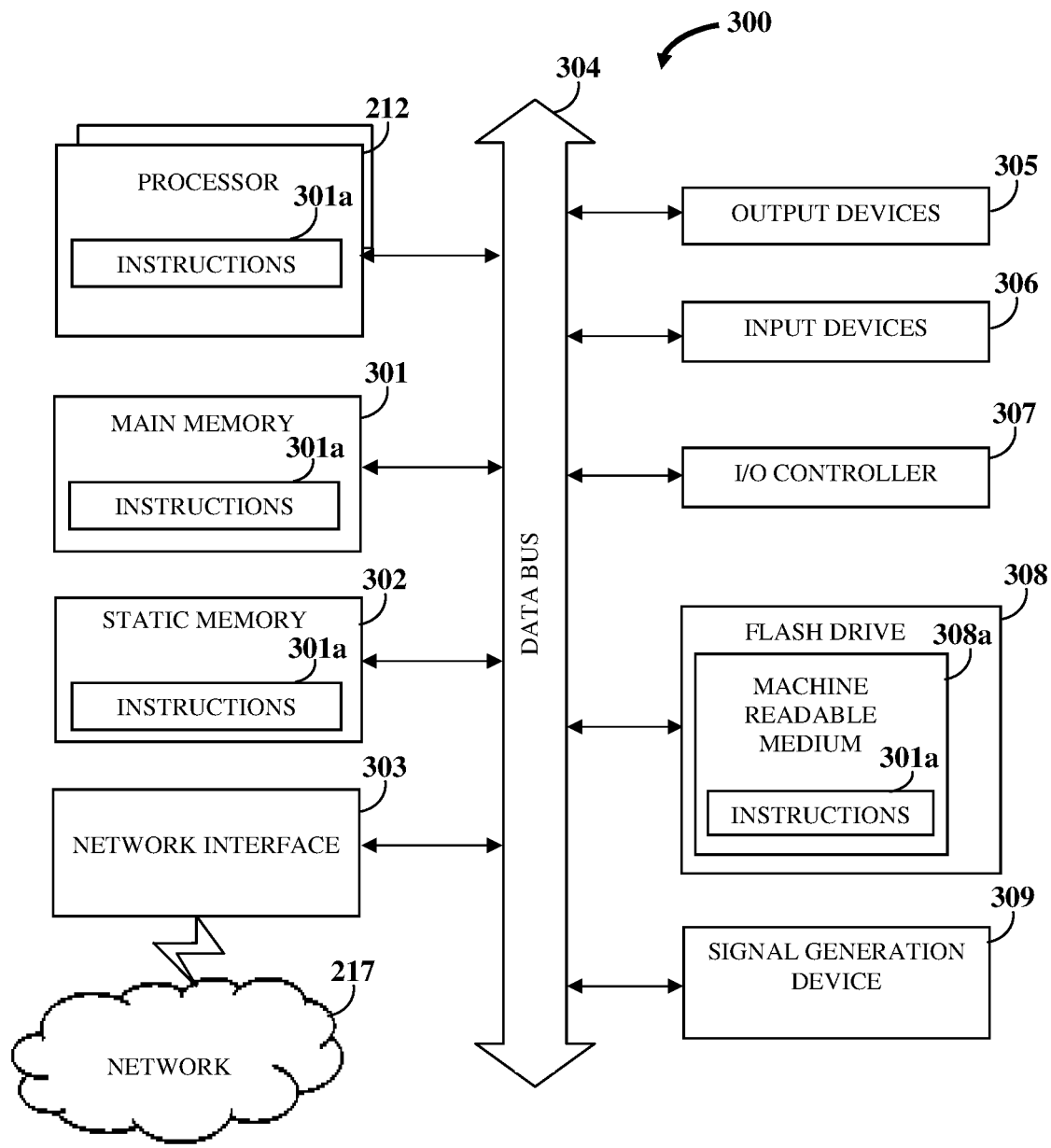
FIG. 3 exemplarily illustrates the hardware architecture of a user device that deploys the virtual and physical environment integration system for dynamically integrating a virtual environment with a physical environment on the user device.

FIG. 3 exemplarily illustrates the hardware architecture 300 of the user device 201 that deploys the virtual and physical environment integration system (VPEIS) 203 exemplarily illustrated in FIG. 2, for dynamically integrating a virtual environment with a physical environment on the user device 201. The user device 201 is a computer system that is programmable using a high level computer programming language. In an embodiment, the VPEIS 203 is implemented using programmed and purposeful hardware. In an embodiment, the VPEIS 203 communicates with one or more auxiliary user devices 216a and 216b via the network 217 exemplarily illustrated in FIG. 2, for example, a short range network or a long range network.

As exemplarily illustrated in FIG. 3, the hardware architecture 300 of the user device 201 comprises the processor 212, a non-transitory computer readable storage medium such as the memory unit 202 exemplarily illustrated in FIG. 2, comprising a main memory 301 and a static memory 302 for storing programs and data, a network interface 303, a data bus 304, output devices 305, input devices 306, an input/output (I/O) controller 307, a flash drive 308, a signal generation device 309, etc. The processor 212 refers to any one or more microprocessors, central processing unit (CPU) devices, graphics processing units, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions 301a, or state transitions. In an embodiment, the processor 212 is implemented as a processor set comprising, for example, a programmed microprocessor and a math or graphics co-processor. The processor 212 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The virtual and physical environment integration system (VPEIS) 203 disclosed herein is not limited to employing a processor 212. In an embodiment, the VPEIS 203 employs a controller or a microcontroller. The processor 212 executes the modules, for example, 204, 205, 205a, 205b, 205c, 205d, 206, 207, 208, 209, 210, 211, etc., of the VPEIS 203.

The memory unit 202 comprising the main memory 301 and the static memory 302 is used for storing program instructions 301a, applications, and data. For example, the instructions 301a defined by the data reception module 204, the integration module 205 comprising the orientation module 205a, the sensing module 205b, the interaction module 205c, and the audio module 205d, the image processing module 206, the configuration module 207, the communication module 208, the view module 209, the filter module 210, the storage module 211, etc., are stored in the main memory 301 and the static memory 302 of the memory unit 202. The main memory 301 is, for example, a random access memory (RAM) or another type of dynamic storage device that stores information and instructions 301a for execution by the processor 212. The main memory 301 also stores temporary variables and other intermediate information used during execution of the instructions 301a by the processor 212. The static memory 302 comprises a read only memory (ROM) or another type of static storage device that stores static information for the processor 212. In an embodiment, the instructions 301a reside, completely or at least partially, within the main memory 301 and/or within the processor 212 during execution thereof by the user device 201. In an embodiment, the main memory 301 and the processor 212 constitute machine readable media. In an embodiment, the instructions 301a are transmitted or received over the network 217 via the network interface 303 by utilizing any one of a number of transfer protocols, for example, a hypertext transfer protocol (HTTP).

The network interface 303 enables connection of the virtual and physical environment integration system (VPEIS) 203 in the user device 201 to the network 217. In an embodiment, the network interface 303 is provided as an interface card also referred to as a line card. The network interface 303 comprises, for example, one or more of an infrared (IR) interface, an interface implementing WiFi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 304 permits communications between the modules, for example, 204, 205, 205a, 205b, 205c, 205d, 206, 207, 208, 209, 210, 211, 214a, etc., of the VPEIS 203.

The output devices 305, for example, the display unit 214 via the graphical user interface (GUI) 214a exemplarily illustrated in FIG. 2, display information, display interfaces, interface elements such as text fields, checkboxes, text boxes, windows, clickable icons, a virtual joystick, etc., for receiving user inputs and for displaying the integrated virtual environment. The output devices 305 comprise, for example, a video display, a liquid crystal display, a plasma display, an organic light emitting diode (OLED) based display, etc. The input devices 306 are used for inputting data into the virtual and physical environment integration system (VPEIS) 203. The user uses the input devices 306 to provide inputs, for example, dimensions of the physical environment, the user's height, configurations for the settings of the sensors 215 exemplarily illustrated in FIG. 2, the device elements, etc., to the VPEIS 203. The input devices 306 are, for example, a keyboard such as an alphanumeric keyboard, a microphone, a joystick, a pointing device such as a computer mouse, a touch pad, a light pen, a physical button, a touch sensitive display device, a track ball, a pointing stick, a cursor control device, a voice recognition unit, a biometric verification unit, any device capable of sensing a tactile input, etc. Computer applications and programs are executed by double clicking a related icon displayed on the graphical user interface (GUI) 214a on one of the output devices 305 using one of the input devices 306. The output devices 305 output the results of operations performed by the VPEIS 203. For example, the VPEIS 203 renders the integrated virtual environment with the physical environment to the user using the output devices 305. The I/O controller 307 controls input actions and output actions performed by the VPEIS 203.

Computer applications and programs are used for operating the virtual and physical environment integration system (VPEIS) 203. The programs are loaded onto the flash drive 308 and into the main memory 301 and/or the static memory 302 of the VPEIS 203. The flash drive 308 comprises a machine readable medium 308a that stores one or more sets of instructions 301a and data structures that embody or utilize any one or more of the methods or functions disclosed herein. While the machine readable medium 308a is shown in an example embodiment to be a single medium, "machine readable medium" should be taken to include a single medium or multiple media, for example, a centralized or distributed database and/or associated caches and servers that store one or more sets of instructions, for example, 301a. Further, "machine readable medium" shall also be taken to include any medium that is capable of storing, encoding, or carrying a set of instructions 301a for execution by a machine and that causes the machine to perform any one or more of the methodologies of the computer implemented method disclosed herein, or that is capable of storing, encoding, or carrying data structures utilized by or associated with such a set of instructions 301a. In an embodiment, the computer applications and programs are loaded into the user device 201 directly via the network 217. The signal generation device 309 communicates with the speakers 213 to generate audio signals.

The processor 212 executes an operating system, for example, the Linux® operating system, the Unix® operating system, any version of the Microsoft® Windows® operating system, the Mac OS® of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android® operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The virtual and physical environment integration system (VPEIS) 203 employs the operating system for performing multiple tasks. The operating system of the user device 201 determines the programming languages used in the VPEIS 203. For example, Java® is used for developing the VPEIS 203 on a user device 201 with an Android® operating system, while Objective-C® of Apple Inc., is used for developing the VPEIS 203 on a user device 201 with the iOS operating system, and the UNITY® libraries and platforms of Unity IPR ApS, LLC., are used developing the VPEIS 203 for both the Android® operating system and the iOS operating system.

The operating system is responsible for management and coordination of activities and sharing of resources of the virtual and physical environment integration system (VPEIS) 203. The operating system further manages security of the VPEIS 203, peripheral devices connected to the VPEIS 203, and network connections. The operating system recognizes, for example, inputs provided by the users using one of the input devices 306, the output devices 305, files, and directories stored locally on the flash drive 308. The operating system executes different programs using the processor 212. The processor 212 and the operating system together define a computer system for which application programs in high level programming languages are written. The VPEIS 203 builds upon public application programming interfaces (APIs) offered by the operating system. The graphical user interface (GUI) 214*a* is implemented using operating system libraries, and the virtual environment is rendered using an open graphics library (OpenGL) implementation supplied by the operating system.

The processor 212 retrieves instructions 301*a* defined by the data reception module 204, the integration module 205, the image processing module 206, the configuration module 207, the communication module 208, the view module 209, the filter module 210, the storage module 211, etc., for performing respective functions disclosed in the detailed description of FIG. 2. The processor 212 also retrieves instructions 301*a* defined by the orientation module 205*a*, the sensing module 205*b*, the interaction module 205*c*, and the audio module 205*d* of the integration module 205 for performing respective functions disclosed in the detailed description of FIG. 2. The processor 212 retrieves the instructions 301*a* for executing the modules, for example, 204, 205, 205*a*, 205*b*, 205*c*, 205*d*, 206, 207, 208, 209, 210, 211, etc., of the virtual and physical environment integration system (VPEIS) 203 from the main memory 301 and the static memory 302 and stores the instructions 301*a*. A program counter determines the location of the instructions 301*a* in the main memory 301 and the static memory 302. The program counter stores a number that identifies the current position in the program of each of the modules, for example, 204, 205, 205*a*, 205*b*, 205*c*, 205*d*, 206, 207, 208, 209, 210, 211, etc., of the VPEIS 203. The instructions 301*a* fetched by the processor 212 from the main memory 301 and the static memory 302 after being processed, are decoded. The instructions 301*a* are stored in an instruction register in the processor 212. After processing and decoding, the processor 212 executes the instructions 301*a*, thereby performing one or more processes defined by those instructions 301*a*.

At the time of execution, the instructions 301*a* stored in the instruction register are examined to determine the operations to be performed. The processor 212 then performs the specified operations. The operations comprise, for example, arithmetic operations and logic operations. The operating system performs multiple routines for performing a number of tasks required to assign the input devices 306, the output devices 305, the main memory 301, and the static memory 302 for execution of the modules, for example, 204, 205, 205*a*, 205*b*, 205*c*, 205*d*, 206, 207, 208, 209, 210, 211, etc., of the virtual and physical environment integration system (VPEIS) 203. The tasks performed by the operating system comprise, for example, assigning memory to the modules, for example, 204, 205, 205*a*, 205*b*, 205*c*, 205*d*, 206, 207, 208, 209, 210, 211, etc., of the VPEIS 203, and to data used by the VPEIS 203, moving data between the main memory 301, the static memory 302, and disk units, and handling input/output operations. The operating system performs the tasks on request by the operations and after performing the tasks, the operating system transfers the execution control back to the processor 212. The processor 212 continues the execution to obtain one or more outputs. The outputs of the execution of the modules, for example, 204, 205, 205*a*, 205*b*, 205*c*, 205*d*, 206, 207, 208, 209, 210, 211, etc., of the VPEIS 203 are displayed to the user on the output devices 305.

For purposes of illustration, the detailed description refers to the virtual and physical environment integration system (VPEIS) 203 being run locally on a single user device 201; however the scope of the computer implemented method and system 200 disclosed herein is not limited to the VPEIS 203 being run locally on a single user device 201 via the operating system and the processor 212, but, in an embodiment, may be extended to run remotely over the network 217 by employing a remote server, a mobile phone, or other electronic devices. In an embodiment, one or more portions of the VPEIS 203 are distributed across one or more computer systems (not shown) coupled to the network 217.

In an embodiment, the virtual and physical environment integration system (VPEIS) 203 is implemented in a cloud computing environment. As used herein, "cloud computing environment" refers to a processing environment comprising configurable computing physical and logical resources, for example, networks, servers, storage, applications, services, etc., and data distributed over the network 217. The cloud computing environment provides an on-demand network access to a shared pool of the configurable computing physical and logical resources. In an embodiment, the VPEIS 203 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. In an embodiment, the VPEIS 203 is configured as a cloud computing based platform implemented as a service for dynamically integrating the virtual environment with the physical environment on the user device 201. In the above embodiment, the user device 201 displays the integrated virtual environment generated by the remote server or the cloud computing based platform on the graphical user interface (GUI) 214*a*.

Disclosed herein is also a computer program product comprising a non-transitory computer readable storage medium that stores computer program codes comprising instructions 301*a* executable by at least one processor 212 for dynamically integrating a virtual environment with a physical environment on a user device 201. The computer program product disclosed herein comprises a first computer program code for receiving and processing dimensions of the physical environment from the user device 201; a second computer program code for receiving and processing a reference position of the user device 201 in the physical environment and an orientation of the physical environment from the user device 201; and a third computer program code for dynamically integrating the virtual environment retrieved from the user device 201 with the physical environment on the user device 201 by processing and transforming the received and processed dimensions of the physical environment, the received and processed reference position of the user device 201 in the physical environment, the received and processed orientation of the physical environment, and the retrieved virtual environment.

The third computer program code of the computer program product disclosed herein comprises a fourth computer program code for orienting the retrieved virtual environment relative to the received and processed orientation of the physical environment and the received and processed reference position of the user device 201 in the physical environment to fit the retrieved virtual environment within the physical environment and render virtual objects of the retrieved virtual environment within the physical environment; a fifth computer program code for determining a position of the user device 201, a movement comprising each step taken by the user of the user device 201, and a direction of movement of the user device 201 in the physical environment, in communication with one or more of the sensors 215 internal to the user device 201; a sixth computer program code for dynamically updating the position of the user device 201, the movement comprising each step taken by the user, and the direction of movement of the user device 201 in the oriented virtual environment, in communication with one or more of the sensors 215 of the user device 201; a seventh computer program code for dynamically tracking a position, a movement, and a direction of movement of each of the rendered virtual objects and the user device 201, interactions between the rendered virtual objects, and interactions of the rendered virtual objects with the user device 201 in the oriented virtual environment, in communication with one or more of the sensors 215 of the user device 201, for triggering events in the oriented virtual environment. In an embodiment, the computer program product disclosed herein further comprises an eighth computer program code for dynamically adjusting audio of the rendered virtual objects in the oriented virtual environment based on the dynamically tracked position, the movement, and the direction of movement of each of the rendered virtual objects relative to the position of the user device 201.

In an embodiment, the fourth computer program code of the computer program product disclosed herein comprises a ninth computer program code for rendering images of the physical environment captured by one or more image capture devices of the user device 201 on the graphical user interface (GUI) 214a; a tenth computer program code for overlaying a boundary of the retrieved virtual environment on the rendered images of the physical environment; and an eleventh computer program code for aligning the overlaid boundary of the retrieved virtual environment with a boundary of the physical environment during rotations of the user device 201 to determine a compass bearing at which the overlaid boundary of the retrieved virtual environment and the boundary of the physical environment align. In another embodiment, the fourth computer program code comprises a twelfth computer program code for utilizing a rotation matrix that defines a rotation of the user device 201, created using motion data from one or more of the sensors 215 of the user device 201 for the orientation of the retrieved virtual environment relative to the received and processed orientation of the physical environment and the received and processed reference position of the user device 201 in the physical environment. In another embodiment, the fourth computer program code further comprises a thirteenth computer program code for updating the orientation of the retrieved virtual environment relative to the received and processed orientation of the physical environment on the user device 201 based on an update to the reference position of the user device 201 at any time instant.

In an embodiment, the computer program product disclosed herein further comprises a fourteenth computer program code for receiving and processing a height of the user to determine a distance covered in a single step by the user in the physical environment for the determination of the position of the user device 201, the movement comprising each step taken by the user, and the direction of movement of the user device 201 in the physical environment. In another embodiment, the computer program product disclosed herein further comprises a fifteenth computer program code for dynamically tracking the position, the movement, and the direction of movement of the user device 201 in the physical environment using a combination of the received and processed height of the user, each step taken by the user and tracked by the virtual and physical environment integration system (VPEIS) 203 in communication with one or more of the sensors 215 of the user device 201, and the direction of movement of the user device 201 determined in communication with one or more of the sensors 215 of the user device 201, and a sixteenth computer program code for dynamically updating the dynamically tracked position, the movement, and the direction of movement of the user device 201 in the oriented virtual environment.

In another embodiment, the computer program product disclosed herein further comprises a seventeenth computer program code for triggering a capture of images of the virtual environment dynamically integrated with the physical environment by one or more image capture devices of the user device 201 via the graphical user interface (GUI) 214a and an eighteenth computer program code for storing the captured images in the user device 201 for analysis, modification, and distribution of the stored images. In another embodiment, the computer program product disclosed herein further comprises a nineteenth computer program code for communicating with one or more auxiliary user devices 216a and 216b via the network 217 to allow participation of one or more auxiliary user devices 216a and 216b in the dynamically integrated virtual environment.

The computer program product disclosed herein further comprises one or more additional computer program codes for performing additional steps that may be required and contemplated for dynamically integrating a virtual environment with a physical environment on a user device 201. In an embodiment, a single piece of computer program code comprising computer executable instructions 301a performs one or more steps of the computer implemented method disclosed herein for dynamically integrating a virtual environment with a physical environment on a user device 201. The computer program codes comprising computer executable instructions 301a are embodied on the non-transitory computer readable storage medium. The processor 212 retrieves these computer executable instructions 301a and executes them. When the computer executable instructions 301a are executed by the processor 212, the computer executable instructions 301a cause the processor 212 to perform the steps of the computer implemented method for dynamically integrating a virtual environment with a physical environment on a user device 201.

Figure 4A:
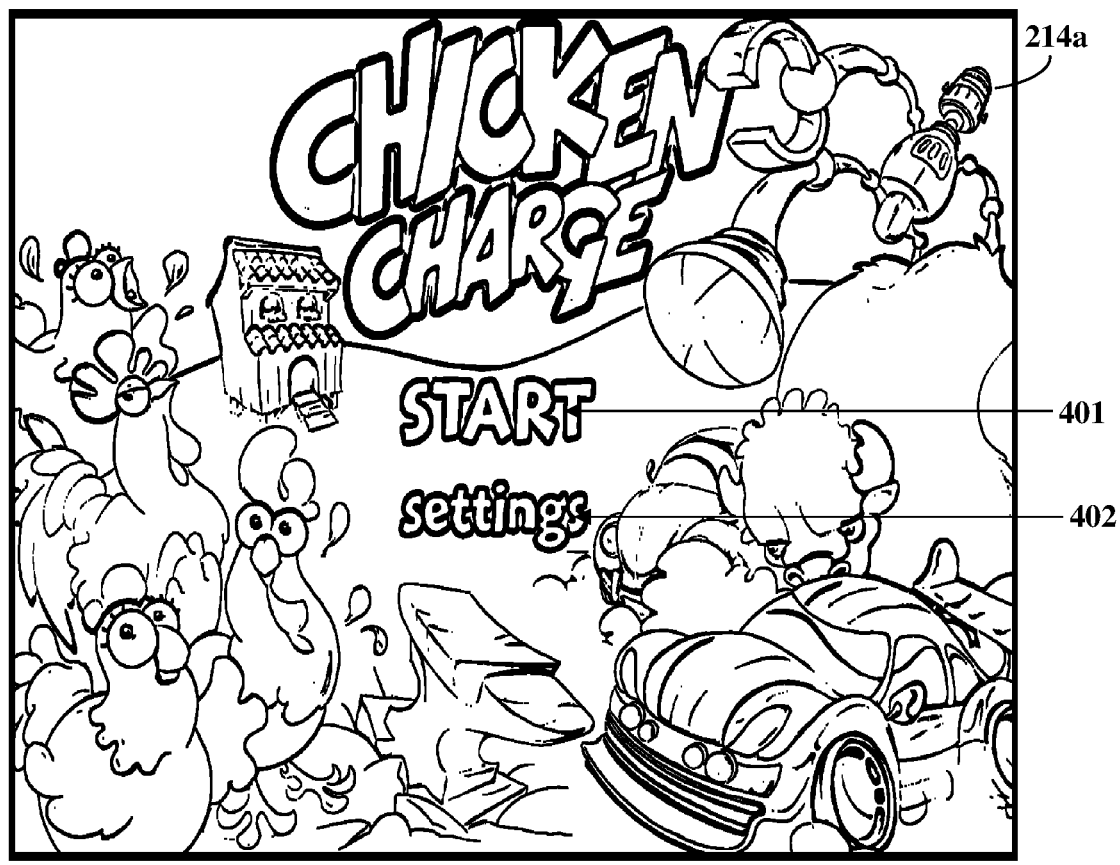
FIGS. 4A-4H exemplarily illustrate screenshots of a graphical user interface provided by the virtual and physical environment integration system for dynamically integrating a virtual environment with a physical environment on a user device.
Figure 4B:
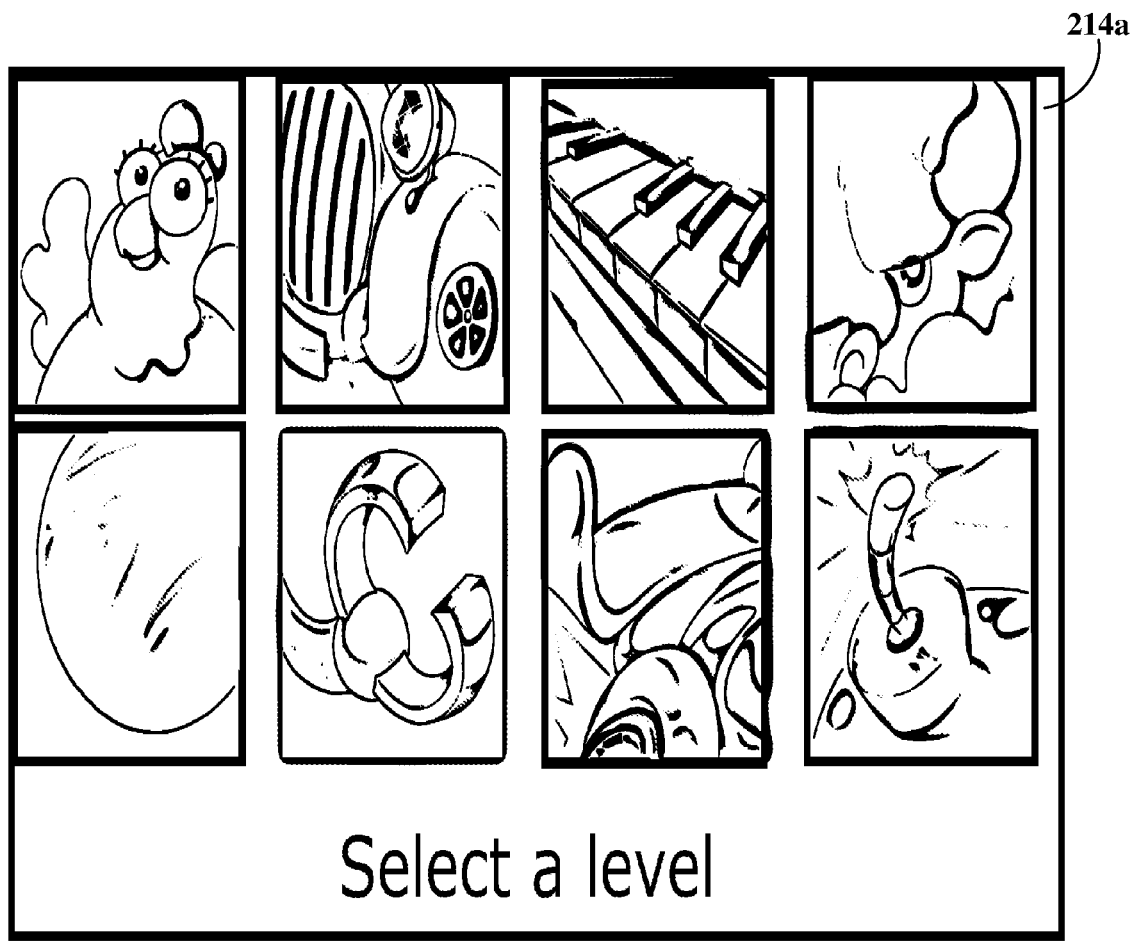
Figure 4C:
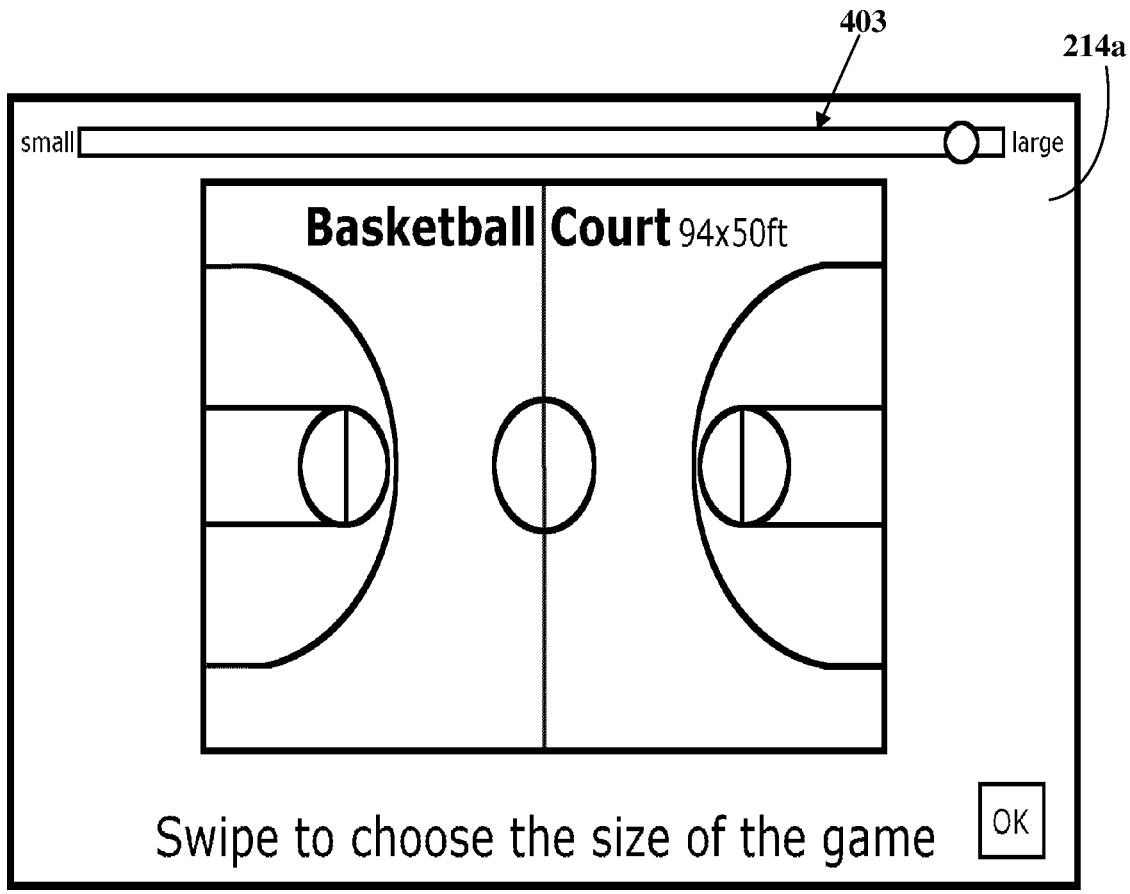
Figure 4D:
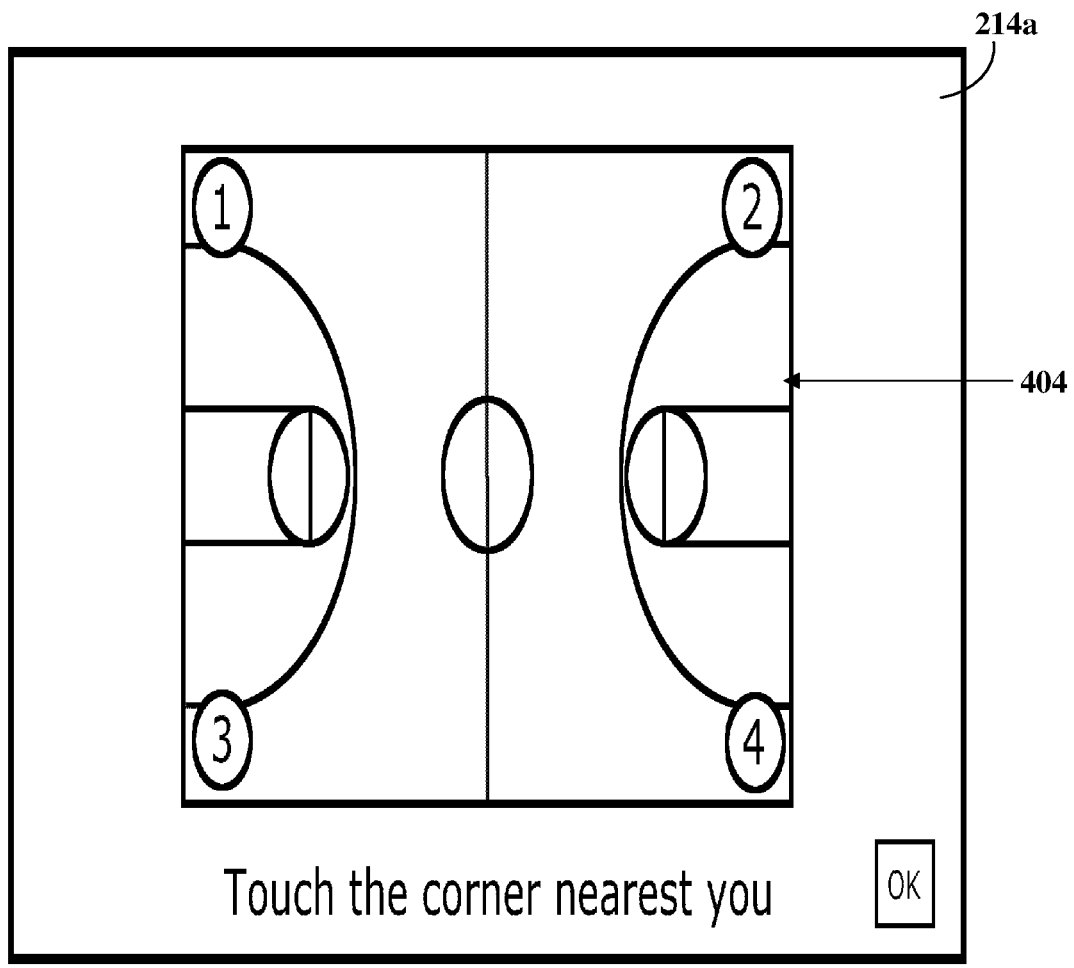
Figure 4E:
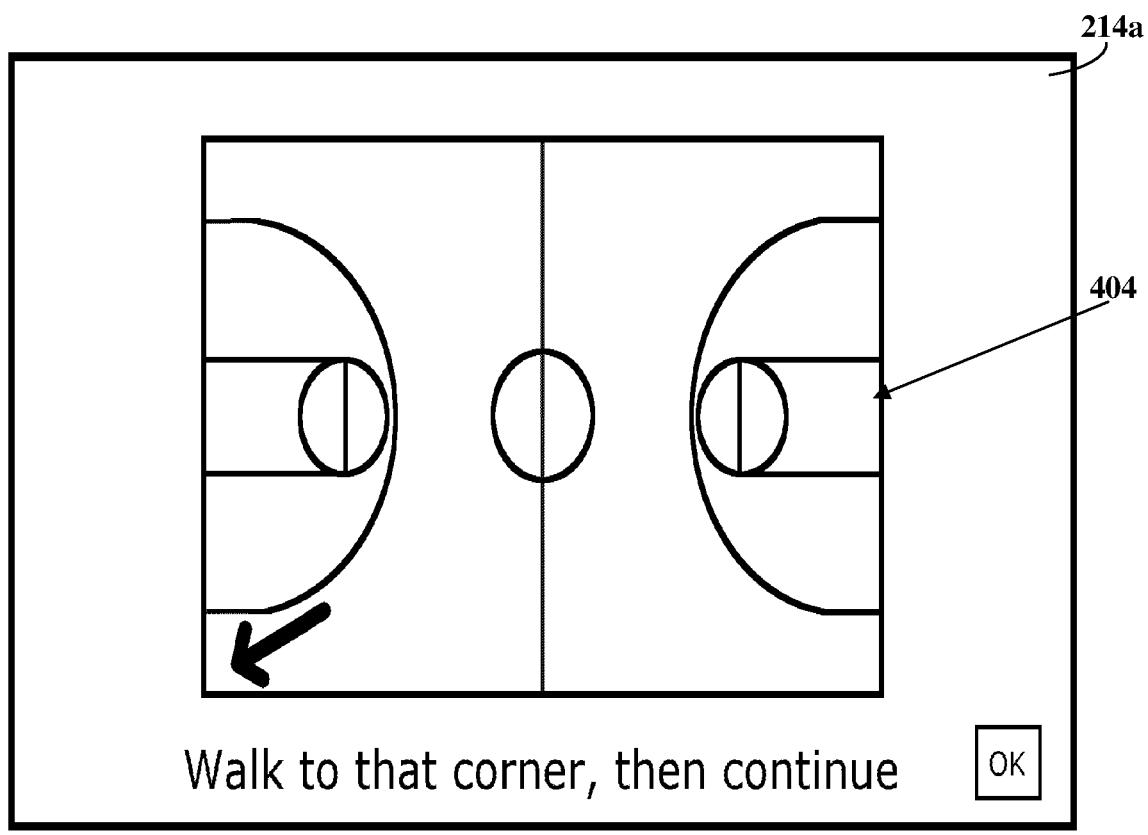
Figure 4F:
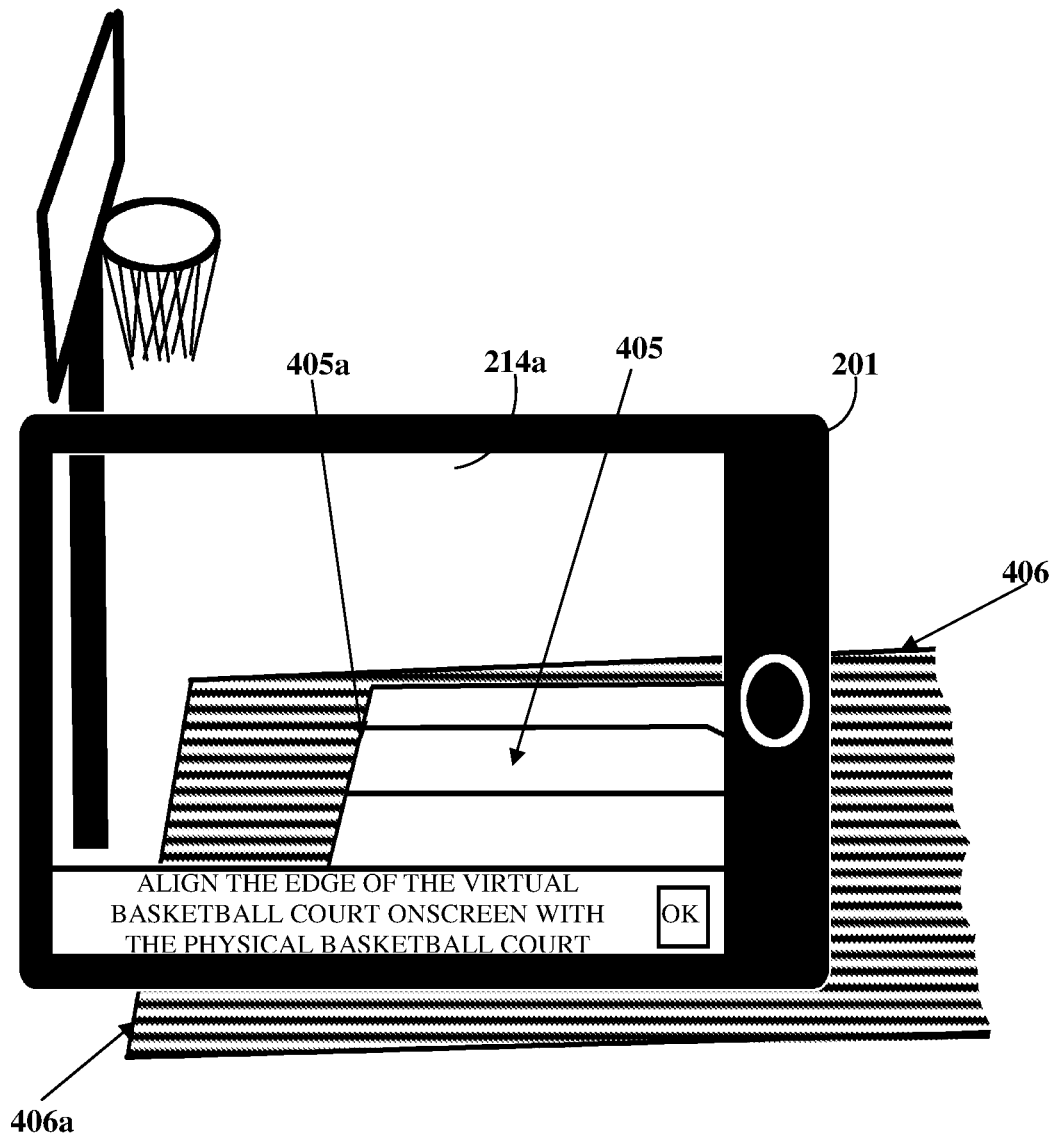
Figure 4G:
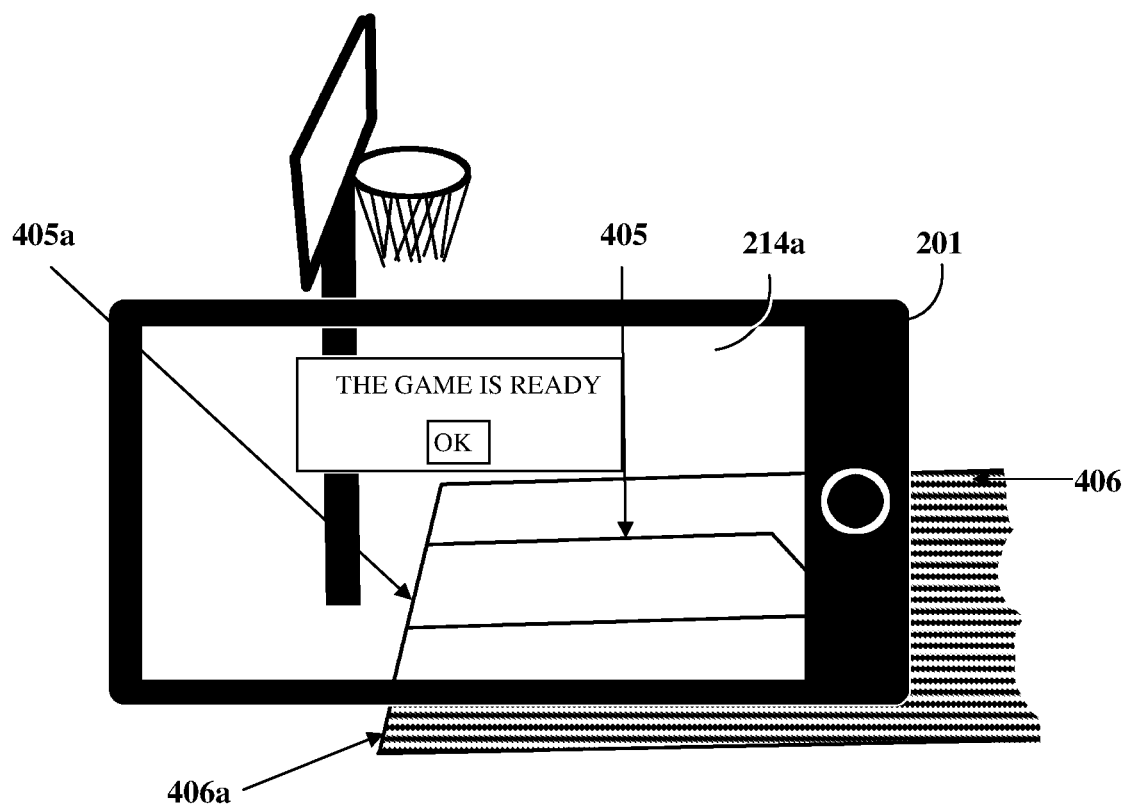
Figure 4H:
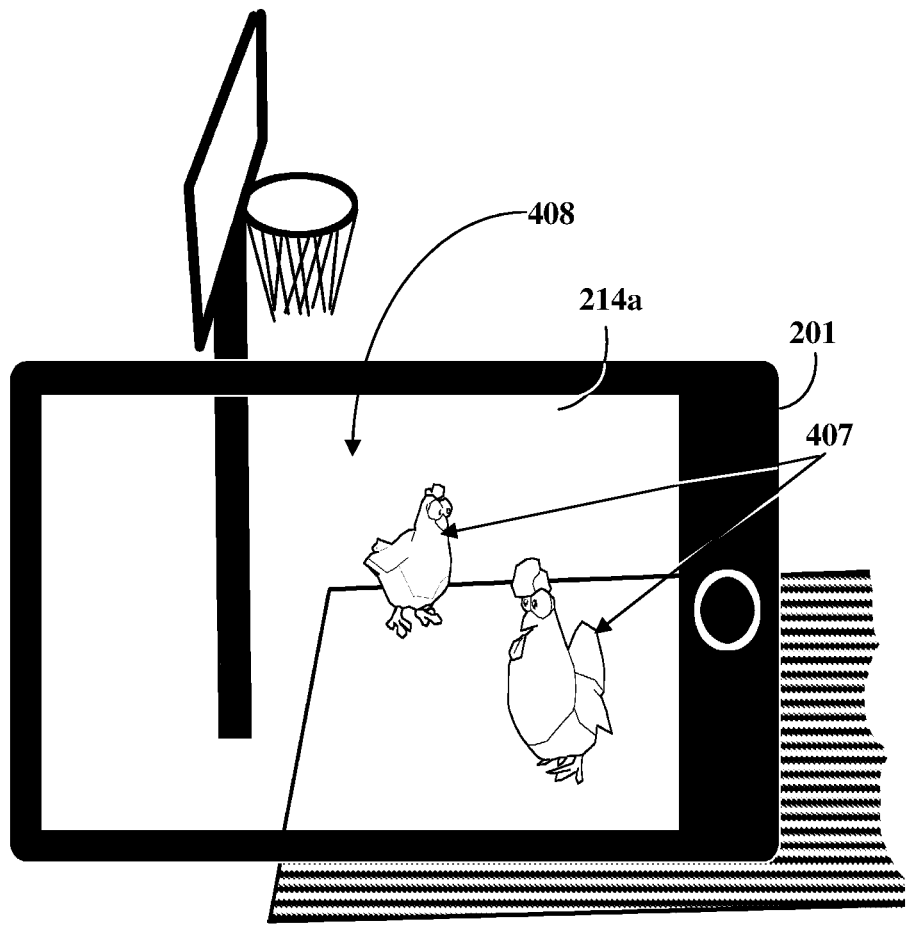

FIGS. 4A-4H exemplarily illustrate screenshots of a graphical user interface (GUI) 214a provided by the virtual and physical environment integration system (VPEIS) 203 exemplarily illustrated in FIG. 2, for dynamically integrating a virtual environment with a physical environment on a user device 201 exemplarily illustrated in FIG. 4F. Consider an example where the VPEIS 203 dynamically integrates a virtual game, for example, "Chicken Charge" with a physical environment, for example, a basketball court on the user device 201. When a user initiates the VPEIS 203 on the user device 201, the VPEIS 203 renders an initialization screen via the GUI 214a as exemplarily illustrated in FIG. 4A. The initialization screen comprises interface elements, for example, a start button 401 to initiate establishing the virtual environment within the physical environment and a settings button 402 to configure the virtual game. When the user clicks on the start button 401 on the initialization screen exemplarily illustrated in FIG. 4A, the VPEIS 203 provides an option to select a level for the virtual game on the GUI 214a as exemplarily illustrated in FIG. 4B. When the user selects a level for the virtual game via the GUI 214a exemplarily illustrated in FIG. 4B, the VPEIS 203 prompts the user to specify the size of the virtual game by interacting with user interface widgets, for example, a scroll bar 403 rendered on the GUI 214*a* as exemplarily illustrated in FIG. 4C. The user can slide the scroll bar 403 to select from predetermined sizes ranging, for example, from a 12 feet×12 feet room to a 94 feet×50 feet basketball court. The user selects the size of the basketball court as exemplarily illustrated in FIG. 4C. The VPEIS 203 receives and processes the user defined dimensions of the basketball court.

The virtual and physical environment integration system (VPEIS) 203 then renders a graphical representation 404 of the basketball court with four corners represented, for example, as "1", "2", "3", and "4" on the graphical user interface (GUI) 214*a*, and prompts the user to select a corner nearest to the user on the GUI 214*a* as exemplarily illustrated in FIG. 4D. When the user selects one of the corners "1", "2", "3", and "4" on the graphical representation 404 of the basketball court via the GUI 214*a*, the VPEIS 203 receives the user's selected corner and prompts the user to move to the selected corner as exemplarily illustrated in the FIG. 4E. This ensures that the user starts in a reference position that the physical environment and the virtual environment share. The VPEIS 203 uses the selected corner as the reference position to orient a physical basketball court 406 and a virtual basketball court 405 exemplarily illustrated in FIG. 4F. At this stage, although the physical basketball court 406 and the virtual basketball court 405 share a common point, the virtual basketball court 405 may still be positioned anywhere in a 360 degrees radius around the user. Therefore, the user needs to specify how the virtual basketball court 405 should be oriented to fit within the physical basketball court 406.

To perform the orientation, the VPEIS 203 displays the physical basketball court 406 using an image capture device such as a camera of the user device 201, and superimposes a virtual depiction of the selected basketball court, that is, the virtual basketball court 405 upon the camera image on the graphical user interface (GUI) 214*a* as exemplarily illustrated in FIG. 4F. Onscreen via the GUI 214*a*, the user views a boundary of the virtual basketball court 405 that will be used for integrating the virtual basketball court 405 with the physical basketball court 406. The VPEIS 203 overlays this boundary upon the feed from the camera of the user device 201, and instructs the user to align the boundary of the virtual basketball court 405, herein referred to as the "virtual boundary", with the boundary of the physical basketball court 406, herein referred to as the "physical boundary", in which the user will play. FIG. 4F exemplarily illustrates the physical basketball court 406 comprising, for example, a basketball hoop and a basketball court in the background with the user device 201 in the foreground and with the boundary of the virtual basketball court 405 overlaid upon the camera feed on the GUI 214*a*. The virtual boundary is not yet aligned with the physical boundary. The VPEIS 203 prompts the user to align an edge 405*a* of the generated virtual basketball court 405 with an edge 406*a* of the physical basketball court 406 as exemplarily illustrated in the FIG. 4F. The user aligns the edge 405*a* of the generated virtual basketball court 405 with the edge 406*a* of the physical basketball court 406 via the GUI 214*a* of the user device 201. As the user rotates, the virtual basketball court 405 onscreen remains fixed relative to the user while the physical basketball court 406 captured by the camera of the user device 201 appears to spin. In this manner, the user can rotate until the edges 405*a* of the virtual basketball court 405 align with the edges 406*a* of the physical basketball court 406. At this point, the user indicates that the virtual basketball court 405 is correctly positioned. The VPEIS 203 orients the virtual basketball court 405 with the physical basketball court 406 and renders the oriented virtual basketball court 405 on the user device 201 as exemplarily illustrated in FIG. 4G. At this point, the VPEIS 203 knows the desired size of the playing area, the user's current position in that playing area, and how the virtual basketball court 405 should be aligned with the physical basketball court 406, which provides sufficient information for the VPEIS 203 to depict the integrated virtual game 408. The integrated virtual game 408 is now ready for play.

The virtual and physical environment integration system (VPEIS) 203 prompts the user to start playing the integrated virtual game 408. When the user starts playing the integrated virtual game 408 on the graphical user interface (GUI) 214*a*, the VPEIS 203 renders virtual objects 407, for example, virtual chicken characters on the oriented virtual basketball court 405 as exemplarily illustrated in FIG. 4H, for interactions with the user. The VPEIS 203 determines the position, the movement, and the direction of movement of the user in the physical basketball court 406 through the user device 201 continuously and dynamically updates the position, the movement, and the direction of movement of the user in the integrated virtual game 408. The VPEIS 203 also tracks the position, the movement, and the direction of movement of the virtual objects 407 in the integrated virtual game 408 and the user device 201, interactions between the virtual objects 407, and the interactions between the virtual objects 407 and the user device 201. The VPEIS 203 tracks the distance between the virtual objects 407, an overlap between the virtual objects 407, and an overlap between the user device 201 and the virtual objects 407. The VPEIS 203 triggers an event and generates a sound when the VPEIS 203 detects a collision between the virtual objects 407 and a collision between the virtual objects 407 and the user device 201. The VPEIS 203 dynamically adjusts the sound of the virtual objects 407 in the integrated virtual game 408 based on the position of the user. For example, if the virtual objects 407 are close to the user, the VPEIS 203 generates a sound of a generally high decibel level, and if the virtual objects 407 are far from the user, the VPEIS 203 diminishes the sound, and if the virtual objects 407 are on the left side or the right side of the user, the VPEIS 203 generates more sound in the direction of the virtual objects 407.

It will be readily apparent in different embodiments that the various methods, algorithms, and computer programs disclosed herein are implemented on computer readable media appropriately programmed for computing devices. As used herein, "computer readable media" refers to non-transitory computer readable media that participate in providing data, for example, instructions that are read by a computer, a processor or a similar device. Non-transitory computer readable media comprise all computer readable media, for example, non-volatile media, volatile media, and transmission media, except for a transitory, propagating signal. Non-volatile media comprise, for example, solid state drives, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise Objective-C®, C, C++, C#, Java®, JavaScript®, Ruby, Perl®, Python®, hypertext preprocessor (PHP), Microsoft® .NET, UNITY®, etc. Other object-oriented, functional, scripting, and/or logical programming languages, for example, libraries and platforms of Unity® of Unity IPR ApS LLC, etc., can also be used. In an embodiment, the computer program codes or software programs are stored on or in one or more mediums as object code. In another embodiment, various aspects of the computer implemented method and system 200 disclosed herein are implemented as programmed elements, or non-programmed elements, or any suitable combination thereof. The computer program product disclosed herein comprises one or more computer program codes for implementing the processes of various embodiments.

The computer implemented method and system 200 disclosed herein comprising the virtual and physical environment integration system (VPEIS) 203 can be configured to work in a network environment comprising one or more computers that are in communication with one or more devices via a network 217 exemplarily illustrated in FIG. 2. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 217. Each of the computers and the devices executes an operating system, examples of which are disclosed above. While the operating system may differ depending on the type of computer, the operating system provides the appropriate communications protocols to establish communication links with the network 217. Any number and type of machines may be in communication with the computers.

The computer implemented method and system 200 disclosed herein are not limited to a particular computer system platform, processor, operating system, or network. In an embodiment, one or more aspects of the computer implemented method and system 200 disclosed herein are distributed among one or more computer systems, for example, servers configured to provide one or more services to one or more client computers, or to perform a complete task in a distributed system. For example, one or more aspects of the computer implemented method and system 200 disclosed herein are performed on a client-server system that comprises components distributed among one or more server systems that perform multiple functions according to various embodiments. These components comprise, for example, executable, intermediate, or interpreted code, which communicate over a network using a communication protocol. The computer implemented method and system 200 disclosed herein are not limited to be executable on any particular system or group of systems, and are not limited to any particular distributed architecture, network, or communication protocol.

The foregoing examples have been provided merely for the purpose of explanation and are in no way to be construed as limiting of the computer implemented method and system 200 disclosed herein. While the computer implemented method and system 200 have been described with reference to various embodiments, it is understood that the words, which have been used herein, are words of description and illustration, rather than words of limitation. Further, although the computer implemented method and system 200 have been described herein with reference to particular means, materials, and embodiments, the computer implemented method and system 200 are not intended to be limited to the particulars disclosed herein; rather, the computer implemented method and system 200 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the computer implemented method and system 200 disclosed herein in their aspects.

What is claimed is:

1. A method comprising:
   determining both dimensions of a physical environment obtained by a user device and a reference position of the user device in the physical environment;
   determining an orientation of the physical environment from the user device;
   dynamically integrating a continually updated virtual environment with the physical environment, comprising:
      orienting the continually updated virtual environment relative to the orientation of the physical environment and the reference position of the user device in the physical environment;
      dynamically determining and updating a position of the user device, a movement and a direction of the movement of the user device in the physical environment based on one or more sensors of the user device; and
      rendering virtual moving objects into the continually updated virtual environment in such a way that they are superimposed on the physical environment and capable of autonomous movement throughout the continually updated virtual environment and interacting with the user device;
   receiving a specification of a height of a user; and
   comparing a current reference position of the user device, steps of the user, and a current direction of movement of the user device relative to a current position of the virtual moving objects, movement of the virtual moving objects, and a direction of movement of the virtual moving objects, so as to allow the user to interact with the virtual moving objects while moving the user device in the physical environment.

2. The method according to claim 1, wherein the continually updated virtual environment is configured to allow the user to interact with the virtual moving objects while moving the user device in the physical environment.

3. The method according to claim 1, wherein a perspective of the continually updated virtual environment changes as the user device is moved relative to the physical environment.

4. The method according to claim 3, further comprising synchronizing sound produced by the virtual moving objects as the virtual moving objects move within the continually updated virtual environment and the user device moves relative to the physical environment.

5. The method according to claim 1, further comprising fitting the rendered virtual moving objects of the physical environment to the continually updated virtual environment based on the orienting.

6. The method according to claim 1, further comprising representing the user device in the continually updated virtual environment distinctly from the virtual moving objects.

7. The method according to claim 1, further comprising selectively altering a point of view for the user device.

8. The method according to claim 1, further comprising generating a record of the continually updated virtual environment over time and transmitting the record to a recipient.

9. The method according to claim 1, further comprising selectively adjusting sounds for the user device based on the virtual moving objects and changes in position or action.

10. The method according to claim 1, wherein the one or more sensors of the user device includes a compass sensor used to obtain a rotation matrix that defines a rotation of the user device.

11. The method according to claim 1, further comprising:
communicatively coupling both the user device and an auxiliary user device of another user to a network;
allowing the user device and the auxiliary user device to participate in a same virtual experience simultaneously by enabling both the user device and the auxiliary user device to communicate over the network; and
broadcasting the user device's actions in the same virtual experience to the auxiliary user device on the network.

12. A system comprising:
a user device having at least one processor and a memory communicatively coupled to the at least one processor, the memory for storing instructions executable by the at least one processor to perform a method, the method comprising:
determining both dimensions of a physical environment obtained by the user device and a reference position of the user device in the physical environment;
determining an orientation of the physical environment from the user device;
dynamically integrating a continually updated virtual environment with the physical environment, comprising:
orienting the continually updated virtual environment relative to the orientation of the physical environment and the reference position of the user device in the physical environment;
dynamically determining and updating a position of the user device, a movement and a direction of the movement of the user device in the physical environment based on one or more sensors of the user device; and
rendering virtual moving objects into the continually updated virtual environment in such a way that they are superimposed on the physical environment and capable of autonomous movement throughout the continually updated virtual environment and interacting with the user device;
receiving a specification of a height of a user;
comparing a current reference position of the user device, steps of the user, and a current direction of movement of the user device relative to a current position of the virtual moving objects, movement of the virtual moving objects, and a direction of movement of the virtual moving objects, so as to allow the user to interact with the virtual moving objects while moving the user device in the physical environment.

13. The system according to claim 12, wherein the continually updated virtual environment is configured to allow the user to interact with the virtual moving objects while moving the user device in the physical environment.

14. The system according to claim 12, wherein a perspective of the continually updated virtual environment changes as the user device is moved relative to the physical environment.

15. The system according to claim 14, wherein the method further comprises synchronizing sound produced by the virtual moving objects as the virtual moving objects move within the continually updated virtual environment and the user device moves relative to the physical environment.

16. The system according to claim 12, wherein the method further comprises fitting the rendered virtual moving objects of the physical environment to the continually updated virtual environment based on the orienting.

17. The system according to claim 12, wherein the method further comprises representing the user device in the continually updated virtual environment distinctly from the virtual moving objects.

18. The system according to claim 12, wherein the method further comprises selectively altering a point of view for the user device.

19. The system according to claim 12, wherein the method further comprises generating a record of the continually updated virtual environment over time and transmitting the record to a recipient.

20. The system according to claim 12, wherein the method further comprises selectively adjusting sounds for the user device based on the virtual moving objects and changes in position or action.

21. The system according to claim 12, wherein the one or more sensors of the user device includes a compass sensor used to obtain a rotation matrix that defines a rotation of the user device.

22. The system according to claim 12, wherein the system further includes:
a network; and
an auxiliary user device of another user, the auxiliary user device having at least one processor and a memory communicatively coupled to the at least one processor, the memory for storing instructions executable by the at least one processor;
and the method further comprising:
communicatively coupling both the user device and the auxiliary user device of another user to a network;

allowing the user device and the auxiliary user device to participate in a same virtual experience simultaneously by enabling both the user device and the auxiliary user device to communicate over the network; and broadcasting the user device's actions in the same virtual experience to the auxiliary user device on the network.

* * * * *